United States Patent
Yanagisawa et al.

(10) Patent No.: US 11,567,340 B2
(45) Date of Patent: Jan. 31, 2023

(54) OPTICAL UNIT WITH CORRECTION FUNCTION

(71) Applicants: Samsung Electronics Co., Ltd., Gyeonggi-do (KR); NIDEC SANKYO CORPORATION, Nagano (JP)

(72) Inventors: Kazuhiko Yanagisawa, Nagano (JP); Tadashi Takeda, Nagano (JP); Shinji Minamisawa, Nagano (JP); Jun Yamashita, Nagano (JP); Takeshi Sue, Nagano (JP); Chanyoung Moon, Gyeonggi-do (KR); Hyungjin Rho, Gyeonggi-do (KR); Doukyoung Song, Gyeonggi-do (KR); Hongbum Park, Gyeonggi-do (KR)

(73) Assignees: SAMSUNG ELECTRONICS CO., LTD., Gyeonggi-Do (KR); NIDEC SANKYO CORPORATION, Nagano (JP)

(*) Notice: Subject to any disclaimer, the term of this patent is extended or adjusted under 35 U.S.C. 154(b) by 193 days.

(21) Appl. No.: 17/154,584

(22) Filed: Jan. 21, 2021

(65) Prior Publication Data
US 2021/0231967 A1    Jul. 29, 2021

(30) Foreign Application Priority Data
Jan. 23, 2020    (KR) .................. 10-2020-0009377

(51) Int. Cl.
G02B 27/64    (2006.01)
G03B 5/06    (2021.01)
G03B 30/00    (2021.01)

(52) U.S. Cl.
CPC ............. *G02B 27/646* (2013.01); *G03B 5/06* (2013.01); *G03B 30/00* (2021.01); *G03B 2205/0023* (2013.01); *G03B 2205/0069* (2013.01)

(58) Field of Classification Search
None
See application file for complete search history.

(56) References Cited

U.S. PATENT DOCUMENTS

2015/0336211 A1   11/2015   Watanabe et al.
2021/0132407 A1*  5/2021    Minamisawa ........... G03B 5/00

FOREIGN PATENT DOCUMENTS

JP    2015217432 A    12/2015

* cited by examiner

*Primary Examiner* — Derek S. Chapel
(74) *Attorney, Agent, or Firm* — Cantor Colburn LLP

(57) ABSTRACT

The present disclosure provides an optical unit with shake correction function capable of preventing a thrust receiving member, which fixes a sphere, from falling off from the movable body in an optical axis direction. According to some embodiments of the present disclosure, a thrust receiving member to which a first sphere is fixed is held by a holding portion formed of the cutout recess provided in a fixed body. A bottom wall surface of the holding portion makes contact with a bent plate portion of the thrust receiving member from −Z direction side. Further, locked surface parts provided on a pair of side wall surfaces of a holding portion make contact, from +Z direction side, with a pair of locking plate portions protruding from a bent plate portion in circumferential direction in the thrust receiving member.

14 Claims, 13 Drawing Sheets

FIG. 13
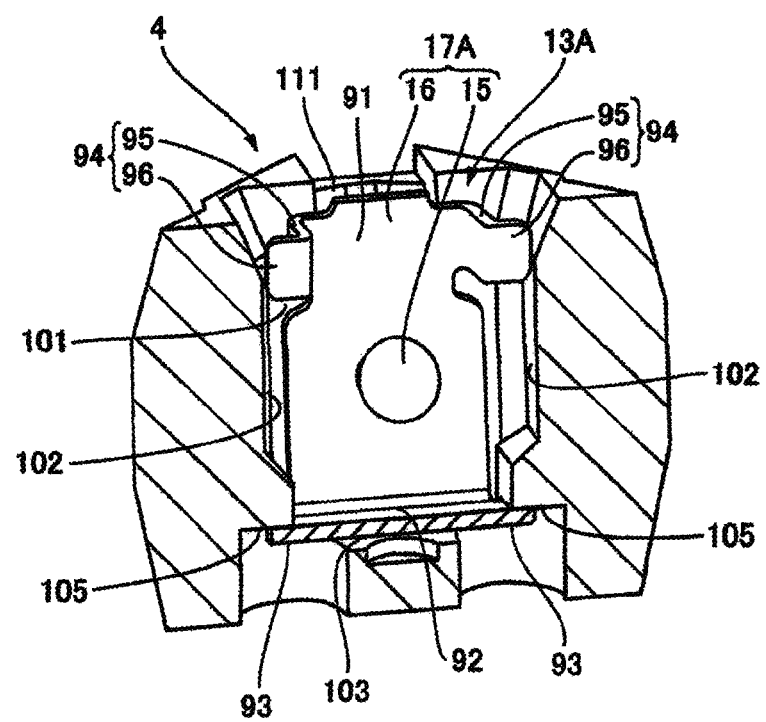
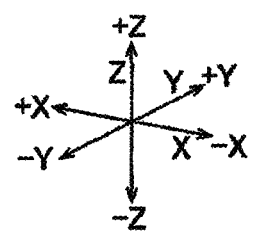

OPTICAL UNIT WITH CORRECTION FUNCTION

CROSS-REFERENCE TO RELATED APPLICATION

The present invention claims priority under 35 U.S.C. § 119 to Korean Patent Application No. 10-2020-0009377, filed on Jan. 23, 2020, the entire contents of which are incorporated herein by reference.

TECHNICAL FIELD

The present disclosure relates to an optical unit with a shake correction function, which includes a connection mechanism configured to rotatably connect a movable body including a camera module and a gimbal frame via a sphere. Further, the present disclosure relates to an optical unit with a shake correction function, which includes a connection mechanism configured to rotatably connect a gimbal frame and a fixed body via a sphere.

BACKGROUND

A certain optical unit mounted on a mobile terminal or a mobile body includes a mechanism that corrects a shake by rotating a movable body mounted with a camera module around a predetermined axis in order to suppress disturbance of a captured image during movement of the mobile terminal or the mobile body. Patent Document 1 discloses this kind of optical unit with a shake correction function.

The optical unit with the shake correction function of Patent Document 1 includes a movable body, a fixed body, and a gimbal mechanism that connects the movable body and the fixed body. The gimbal mechanism supports the movable body so as to be rotatable around a predetermined axis. The gimbal mechanism includes a metal-made rectangular frame-shaped gimbal frame and a connection mechanism that connects the gimbal frame and the movable body so as to be rotatable around the axis. The connection mechanism includes a metal-made sphere, sphere fixing portions to which the sphere is fixed, and sphere support portions having hemispherical recesses with which the sphere makes contact. The sphere fixing portions are the inner surfaces of a pair of corner portions facing each other in a predetermined axial direction in the gimbal frame. The sphere is fixed to the inner surfaces of the corner portions by welding. The sphere support portions having the hemispherical recesses are provided at two locations facing the respective sphere fixing portions in a predetermined axial direction in the movable body.

PRIOR ART DOCUMENT

Patent Document
Patent Document 1: Japanese Patent Application Publication No. 2015-217432

In the connection mechanism that connects the movable body and the gimbal frame via the sphere, the sphere may be mounted on the side of the movable body, and a concave curved surface with which the sphere makes contact may be provided on the side of the gimbal frame. Furthermore, in this case, it is conceivable to adopt a configuration in which the metal-made sphere is fixed to a metal-made thrust receiving member by welding and the thrust receiving member is held by the movable body. This is because the material of the movable body can be freely selected as compared with a case where the metal-made sphere is directly welded and fixed to the movable body.

In this regard, when a mobile terminal or a mobile body equipped with an optical unit with a shake correction function receives an impact from the outside, a load in a direction intersecting a predetermined axis due to a weight of the movable body or the like may be applied to the connection mechanism. That is, a load in an optical axis direction may be applied to the connection mechanism. Therefore, in the configuration in which the thrust receiving member to which the sphere is fixed is held by the movable body, there is a possibility that the thrust receiving member may fall off from the movable body in the optical axis direction due to an external impact.

Furthermore, the connection mechanism using the sphere may also be adopted in a configuration in which the gimbal frame and the fixed body are connected such that the gimbal frame and the fixed body are rotatable around a predetermined axis intersecting an optical axis. In this case as well, when a configuration is adopted in which the metal-made sphere is fixed to the metal-made thrust receiving member by welding and the thrust receiving member is held by the fixed body, there is a possibility that the thrust receiving member may fall off from the fixed body in the optical axis direction due to an external impact.

SUMMARY

Some embodiments of the present disclosure provide an optical unit with a shake correction function capable of preventing a thrust receiving member, which fixes a sphere configured to rotatably connect a movable body and a gimbal frame, from falling off from the movable body in an optical axis direction.

Further, some embodiments of the present disclosure provide an optical unit with a shake correction function capable of preventing a thrust receiving member, which fixes a sphere configured to rotatably connect a fixed body and a gimbal frame, from falling off from the fixed body in an optical axis direction.

According to an embodiment of the present disclosure, there is provided an optical unit with a shake correction function, including: a movable body including a camera module; a gimbal mechanism configured to support the movable body such that the movable body is swingable around a first axis intersecting an optical axis of the camera module and the movable body is swingable around a second axis intersecting the optical axis and the first axis; and a fixed body configured to support the movable body via the gimbal mechanism, wherein the gimbal mechanism includes a gimbal frame and a connection mechanism configured to connect the gimbal frame and the movable body such that the gimbal frame and the movable body are rotatable around the first axis, wherein the connection mechanism includes a gimbal frame receiving member including a sphere and a metal-made thrust receiving member to which the sphere is fixed, and a support portion having a concave curved surface making contact with the sphere, wherein the movable body includes a holding portion configured to hold the gimbal frame receiving member at a position where the first axis passes through a center of the sphere, wherein when a direction extending along the optical axis is defined as an optical axis direction, one side of the optical axis direction is defined as a first direction, the other side of the optical axis direction is defined as a second direction, a direction extending along the first axis is defined as a first axial direction, and a direction extending around the optical axis is defined as a circumferential direction, the thrust receiving member includes a base plate portion including a sphere fixing portion to which the sphere is fixed and facing the support portion via the sphere in the first axial direction, a bent plate portion bent in the first axial direction from a first direction end of the base plate portion and located on a first direction side of the support portion, and a pair of locking plate portions extending from circumferential opposite ends of the bent plate portion, wherein the holding portion is a cutout recess portion that includes a back wall surface configured to make contact with the base plate portion from a side opposite to the support portion in the first axial direction, a pair of side wall surfaces located at circumferential opposite sides of the back wall surface and configured to face each other in the circumferential direction, and a bottom wall surface extending in the first axial direction on a first direction side of the back wall surface and making contact with the thrust receiving member from a first direction side, the holding portion being opened toward a second direction side and one side of the first axial direction, and wherein the side wall surfaces each include locked surface parts formed at positions spaced apart from the bottom wall surface toward the second direction and extending in the circumferential direction to face the locking plate portions from the second direction side respectively.

According to the embodiment of the present disclosure, the thrust receiving member to which the sphere is fixed is held by the holding portion formed of the cutout recess provided in the movable body. In this regard, the bottom wall surface of the cutout recess comes into contact with the bent plate portion of the thrust receiving member from the first direction side. Therefore, the thrust receiving member does not fall off from the movable body toward the first direction. Further, in the thrust receiving member, the locked surface parts provided on the pair of side wall surfaces of the cutout recess face, from the second direction side, the pair of locking plate portions protruding from the bent plate portion in the circumferential direction. Therefore, even in a case where the holding portion that holds the thrust receiving member is the cutout recess opened toward the second direction, the thrust receiving member does not fall off from the movable body toward the second direction. Accordingly, even when an impact is applied to the optical unit with the shake correction function from the outside, the thrust receiving member to which the sphere is fixed does not fall off from the movable body in the optical axis direction. The configuration in which the locked surface parts face the pair of locking plate portions from the second direction side includes a case where the locked surface parts make contact with the pair of locking plate portions from the second direction side respectively.

In some embodiments, the locking plate portions may be inclined from the bent plate portion toward the second direction and have tip parts facing the locked surface parts. According to the embodiments, it is easy to prevent each of the locking plate portions facing each of locked surface parts from being removed from each of the locked surface parts toward the second direction.

In some embodiments, each of the side wall surfaces may include opening side surface parts extending toward the second direction from ends of the locked surface parts on a side of the base plate portion and facing each other in the circumferential direction, and bottom wall surface side surface parts extending toward the first direction from ends of the locked surface parts opposite to the base plate portion and facing each other in the circumferential direction, and the locking plate portions may have tip parts facing the bottom wall surface side surface parts. According to the embodiments of the present disclosure, when the thrust receiving member is held by the holding portion, each of the locking plate portions can be caused to face each of the locked surface parts by utilizing the elasticity of the metal-made thrust receiving member. That is, when the thrust receiving member is inserted into the holding portion from the second direction side in order to hold the thrust receiving member in the holding portion, each of the locking plate portions makes contact with the opening side surface part and bends toward the base plate portion, in which state each of the locking plate portions moves toward the first direction. Thereafter, when the bent plate portion reaches the bottom wall surface, the contact between each of the locking plate portions and the opening side surface part is released, and each of the locking plate portions expands to the side opposite to the base plate portion. As a result, each of the locking plate portions is kept locked to each of the locked surface parts.

In some embodiments, an inclination angle at which each of the locking plate portions is inclined toward the second direction from a virtual vertical plane perpendicular to the optical axis may be larger than 45 degrees. According to the embodiments of the present disclosure, when the thrust receiving member is inserted into the holding portion from the second direction side, it becomes easy to bend each of the locking plate portions.

In some embodiments, the thrust receiving member may include a pair of protrusion portions protruding from circumferential opposite ends of the base plate portion on a second direction side of the sphere fixing portion toward a side where the support portion is located in the second axial direction and facing each other in the circumferential direction, the gimbal frame may include a gimbal frame extension portion extending in the optical axis direction via a region between the protrusion portions, the gimbal frame extension portion may include the support portion at a first direction side tip, and further includes a passage portion located between the protrusion portions on a second direction side of the support portion, a width dimension of the support portion in the circumferential direction may be larger than a width dimension of the passage portion in the circumferential direction and larger than a gap between the protrusion portions, and the holding portion may overlaps with the protrusion portions when viewed from the optical axis direction. According to the embodiments of the present disclosure, when the gimbal frame extension portion moves toward the second direction, the support portion and the pair of protrusion portions interfere with each other, whereby the gimbal frame extension portion can be prevented from falling off from the thrust receiving member toward the second direction.

In some embodiments, the protrusion portions each may include protrusion plate parts bending in the first axial direction from the circumferential opposite ends of the base plate portion, and extension plate parts bending from ends of the protrusion plate parts opposite to the base plate portion toward sides opposite to the base plate portion in the circumferential direction, and the extension plate parts may have circumferential ends facing the opening side surface parts of the side wall surfaces respectively. According to the embodiments of the present disclosure, when the thrust receiving member is held by the holding portion, the position of the thrust receiving member can be regulated in the circumferential direction.

In some embodiments, each of the locking plate portions may have the same thickness dimension as the bent plate portion and extends from the bent plate portion without being bent, and each of the locked surface parts and the bottom wall surface may be parallel to each other and may be spaced apart by the thickness dimension of the bent plate portion in the optical axis direction. According to the embodiments of the present disclosure, when the thrust receiving member is held by the holding portion, the bottom wall surface can be brought into contact with the bent plate portion of the thrust receiving member from the first direction side, and the locked surface part can be brought into contact with each of the locking plate portions from the second direction side.

According to another embodiment of the present disclosure, there is provided an optical unit with a shake correction function, including: a movable body including a camera module; a gimbal mechanism configured to support the movable body such that the movable body is swingable around a first axis intersecting an optical axis of the camera module and the movable body is swingable around a second axis intersecting the optical axis and the first axis; and a fixed body configured to support the movable body via the gimbal mechanism, wherein the gimbal mechanism includes a gimbal frame and a connection mechanism configured to connect the gimbal frame and the fixed body such that the gimbal frame and the fixed body are rotatable around the second axis, wherein the connection mechanism includes a gimbal frame receiving member including a sphere and a metal-made thrust receiving member to which the sphere is fixed, and a support portion having a concave curved surface making contact with the sphere in the gimbal frame receiving member, wherein the fixed body includes a holding portion configured to hold the gimbal frame receiving member at a position where the second axis passes through a center of the sphere, wherein when a direction extending along the optical axis is defined as an optical axis direction, one side of the optical axis direction is defined as a first direction, the other side of the optical axis direction is defined as a second direction, a direction extending along the second axis is defined as a second axial direction, and a direction extending around the optical axis is defined as a circumferential direction, the thrust receiving member includes a base plate portion including a sphere fixing portion to which the sphere is fixed and facing the support portion via the sphere in the second axial direction, a bent plate portion bent in the second axial direction from a first direction side end of the base plate portion and located on a first direction side of the support portion, and a pair of locking plate portions extending from circumferential opposite ends of the bent plate portion, wherein the holding portion is a cutout recess portion that includes a back wall surface configured to make contact with the base plate portion from a side opposite to the support portion in the second axial direction, a pair of side wall surfaces located at circumferential opposite sides of the back wall surface and configured to face each other in the circumferential direction, and a bottom wall surface extending in the second axial direction on a first direction side of the back wall surface and making contact with the thrust receiving member from a first direction side, the holding portion being opened toward a second direction and one side of the second axial direction, and wherein the side wall surfaces each include locked surface parts formed at positions spaced apart from the bottom wall surface toward the second direction and extending in the circumferential direction to face the locking plate portions from the second direction side respectively.

According to the present disclosure, the thrust receiving member to which the sphere is fixed is held by the holding portion formed of the cutout recess provided in the fixed body. In this regard, the bottom wall surface of the cutout recess comes into contact with the bent plate portion of the thrust receiving member from the first direction side. Therefore, the thrust receiving member does not fall off from the fixed body toward the first direction. Further, in the thrust receiving member, the locked surface parts provided on the pair of side wall surfaces of the cutout recess face, from the second direction side, the pair of locking plate portions protruding from the bent plate portion in the circumferential direction. Therefore, even in a case where the holding portion that holds the thrust receiving member is the cutout recess opened toward the second direction, the thrust receiving member does not fall off from the fixed body toward the second direction. Accordingly, even when an impact is applied to the optical unit with the shake correction function from the outside, the thrust receiving member to which the sphere is fixed does not fall off from the fixed body in the optical axis direction.

In some embodiments, the locking plate portions may be inclined from the bent plate portion toward the second direction and have tip parts facing the locked surface parts. According to the embodiments of the present disclosure, it is easy to prevent each of the locking plate portions facing each of locked surface parts from being removed from each of the locked surface parts toward the second direction.

In some embodiments, each of the side wall surfaces may include opening side surface parts extending toward the second direction from ends of the locked surface parts on a side of the base plate portion and facing each other in the circumferential direction, and bottom wall surface side surface parts extending toward the first direction from ends of the locked surface parts opposite to the base plate portion and facing each other in the circumferential direction, and the locking plate portions may have tip parts facing the bottom wall surface side surface parts. According to the embodiments of the present disclosure, when the thrust receiving member is held by the holding portion, each of the locking plate portions can be caused to face each of the locked surface parts by utilizing the elasticity of the metal-made thrust receiving member. That is, when the thrust receiving member is inserted into the holding portion from the second direction side in order to hold the thrust receiving member in the holding portion, each of the locking plate portions makes contact with the opening side surface part and bends toward the base plate portion, in which state each of the locking plate portions moves toward the first direction. Thereafter, when the bent plate portion reaches the bottom wall surface, the contact between each of the locking plate portions and the opening side surface part is released, and each of the locking plate portions expands to the side opposite to the base plate portion. As a result, each of the locking plate portions is kept locked to each of the locked surface parts.

In some embodiments, an inclination angle at which each of the locking plate portions is inclined toward the second direction from a virtual vertical plane perpendicular to the optical axis may be larger than 45 degrees. According to the embodiments, when the thrust receiving member is inserted into the holding portion from the second direction side, it becomes easy to bend each of the locking plate portions.

In some embodiments, the thrust receiving member may include a pair of protrusion portions protruding from circumferential opposite ends of the base plate portion on a second direction side of the sphere fixing portion toward a side where the support portion is located in the second axial direction, and facing each other in the circumferential direction, the gimbal frame may include a gimbal frame extension portion extending in the optical axis direction via region between the protrusion portions, the gimbal frame extension portion may include the support portion at a first direction side tip, and further include a passage portion located between the protrusion portions on a second direction side of the support portion, a width dimension of the support portion in the circumferential direction may be larger than a width dimension of the passage portion in the circumferential direction and larger than a gap between the protrusion portions, and the holding portion may overlap with the protrusion portions when viewed from the optical axis direction. According to the embodiments, when the gimbal frame extension portion moves toward the second direction, the support portion and the pair of protrusion portions interfere with each other, whereby the gimbal frame extension portion can be prevented from falling off from the thrust receiving member toward the second direction.

In some embodiments, the protrusion portions each may include protrusion plate parts bending in the second axial direction from the circumferential opposite ends of the base plate portion, and extension plate parts bending from ends of the protrusion plate parts opposite to the base plate portion toward sides opposite to the base plate portion in the circumferential direction, and the extension plate parts may have circumferential ends facing the opening side surface parts of the side wall surfaces respectively. According to the embodiments, when the thrust receiving member is held by the holding portion, the position of the thrust receiving member can be regulated in the circumferential direction.

In some embodiments, each of the locking plate portions may have the same thickness dimension as the bent plate portion and extends from the bent plate portion without being bent, and each of the locked surface parts and the bottom wall surface may be parallel to each other and are spaced apart by the thickness dimension of the bent plate portion in the optical axis direction. According to the embodiments, when the thrust receiving member is held by the holding portion, the bottom wall surface can be brought into contact with the bent plate portion of the thrust receiving member from the first direction side, and the locked surface part can be brought into contact with each of the locking plate portions from the second direction side.

BRIEF DESCRIPTION OF DRAWINGS

The accompanying drawings, which are incorporated in and constitute a part of the specification, illustrate embodiments of the present disclosure.

FIG. 13 is an explanatory view of a modification of a thrust receiving member and a holding portion.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

An embodiment of an optical unit with a shake correction function to which the present disclosure is applied will be described below with reference to the drawings.
(Optical Unit with Shake Correction Function)

Figure 1:
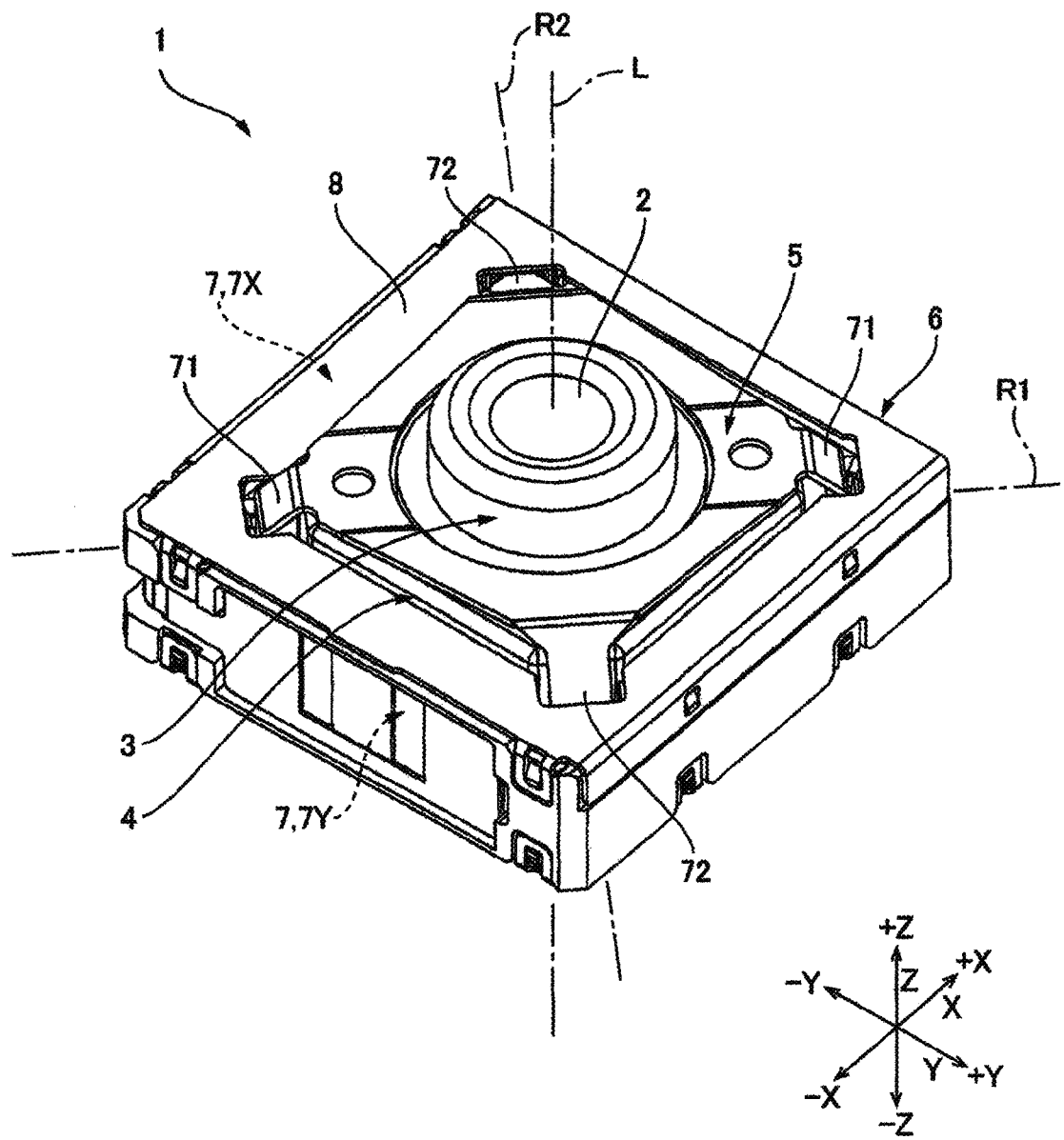
FIG. 1 is a perspective view of an optical unit with a shake correction function.
Figure 2:
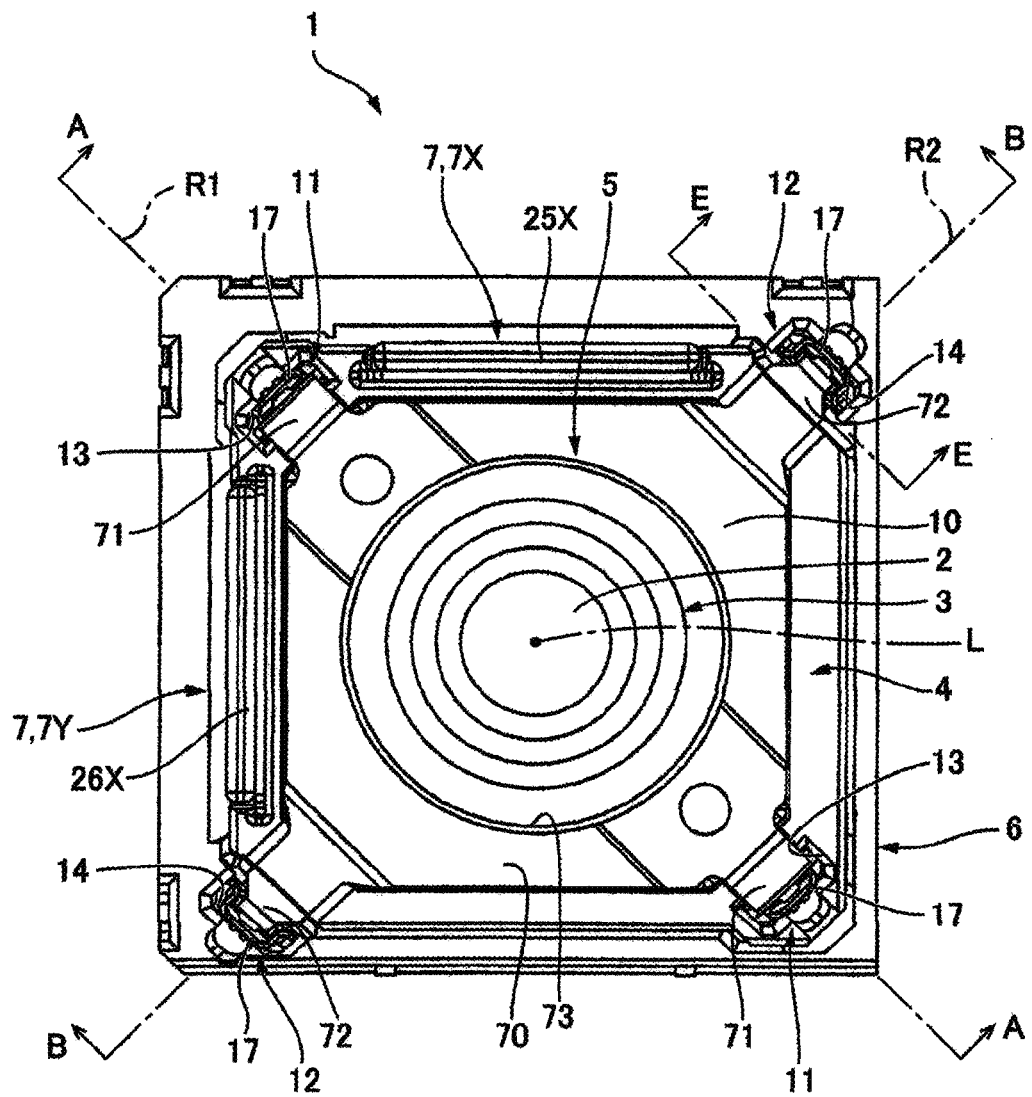
FIG. 2 is a plan view of an optical unit with a shake correction function from which a cover is removed.
Figure 3:
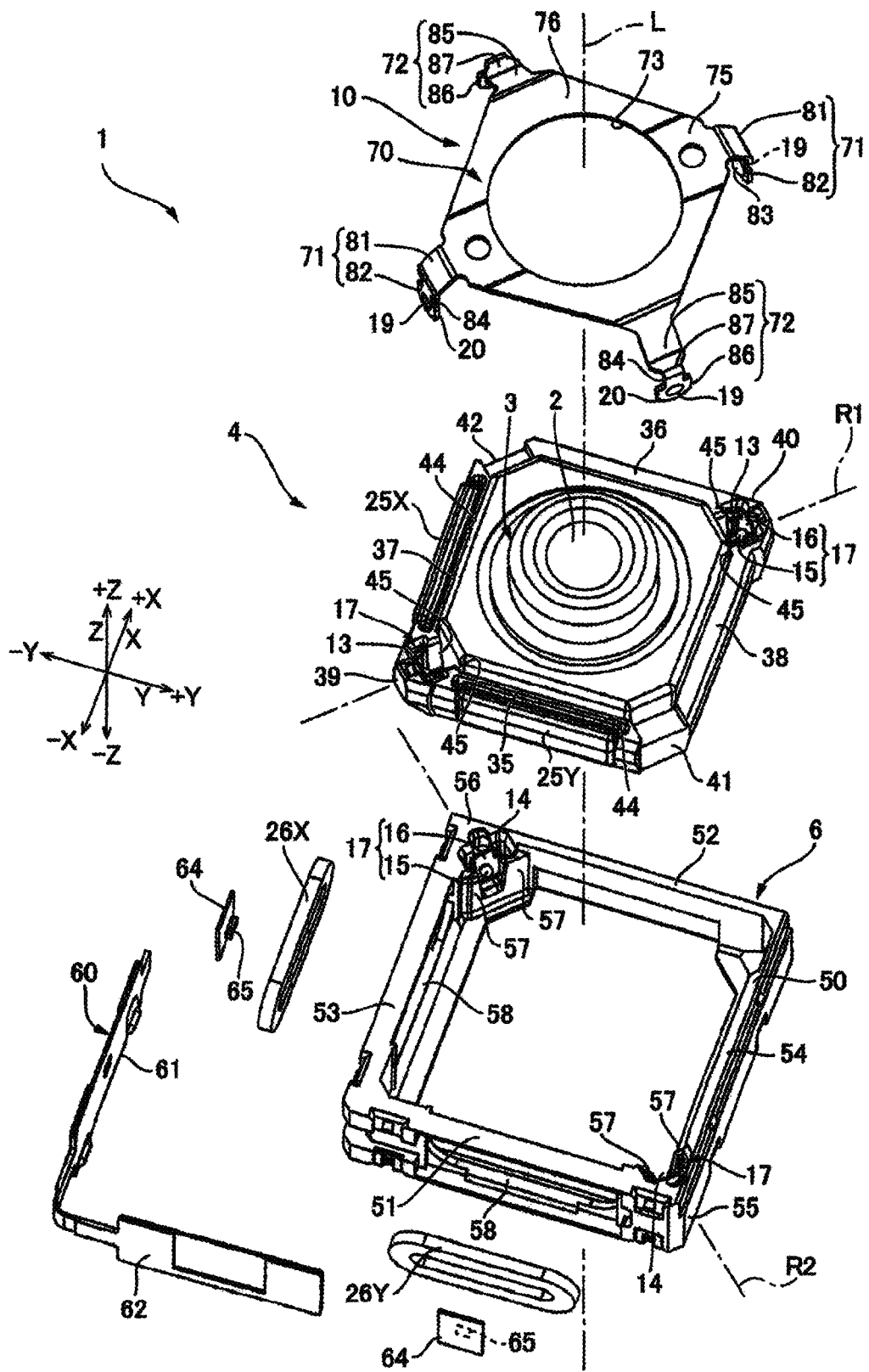
FIG. 3 is an exploded perspective view of an optical unit with a shake correction function.
Figure 4:
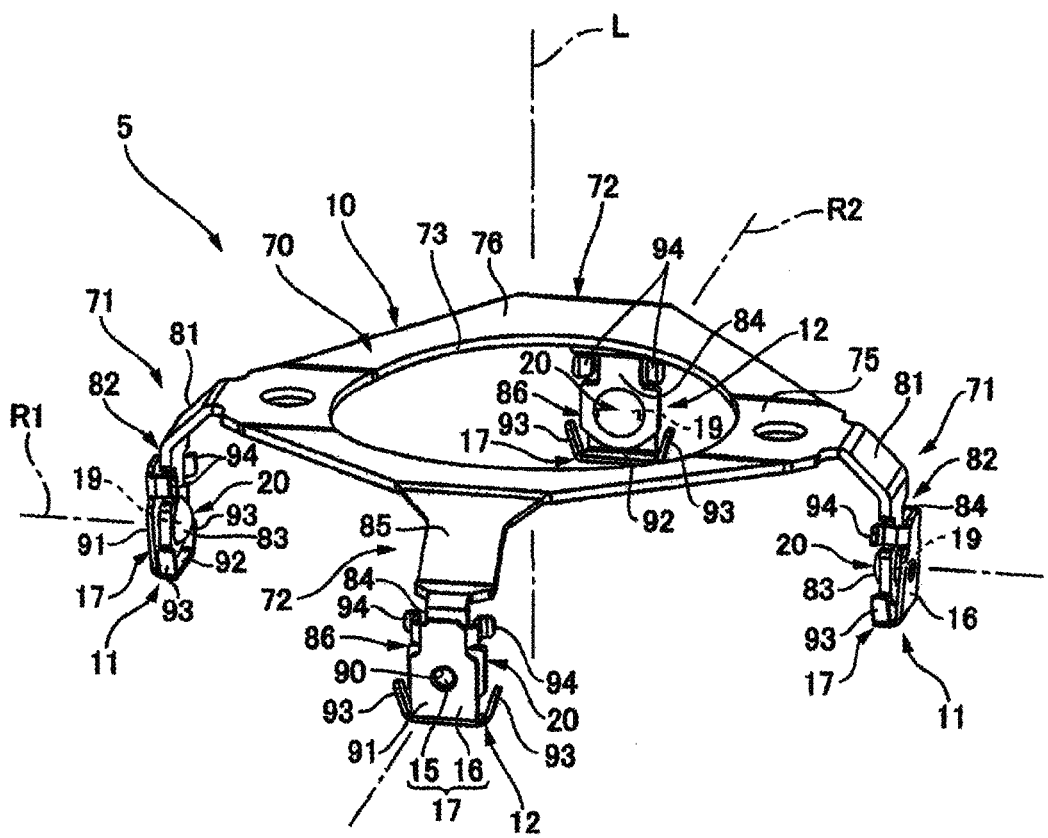
FIG. 4 is a perspective view of a gimbal mechanism.
Figure 5:
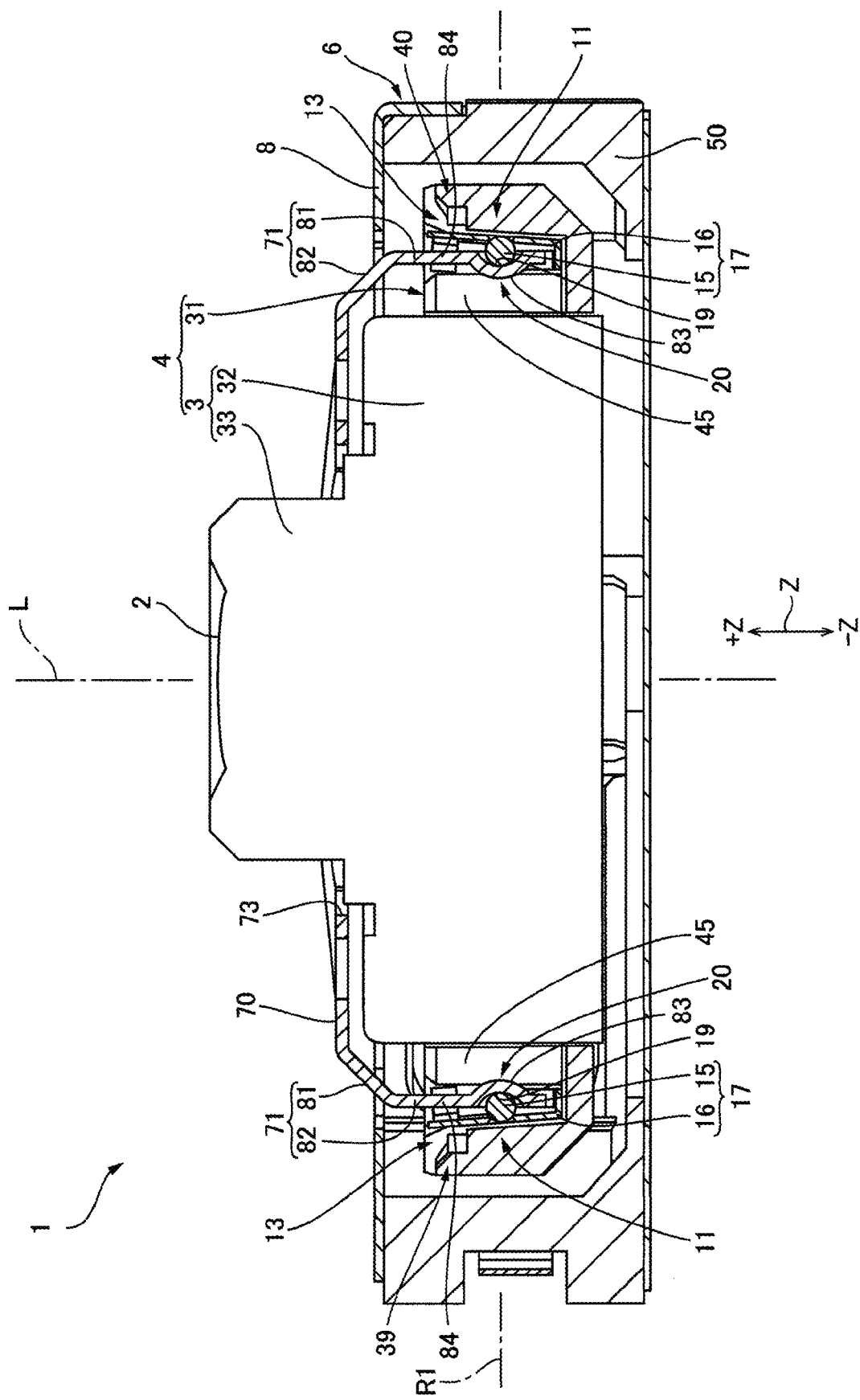
FIG. 5 is a cross-sectional view taken along a line A-A in FIG. 2.
Figure 6:
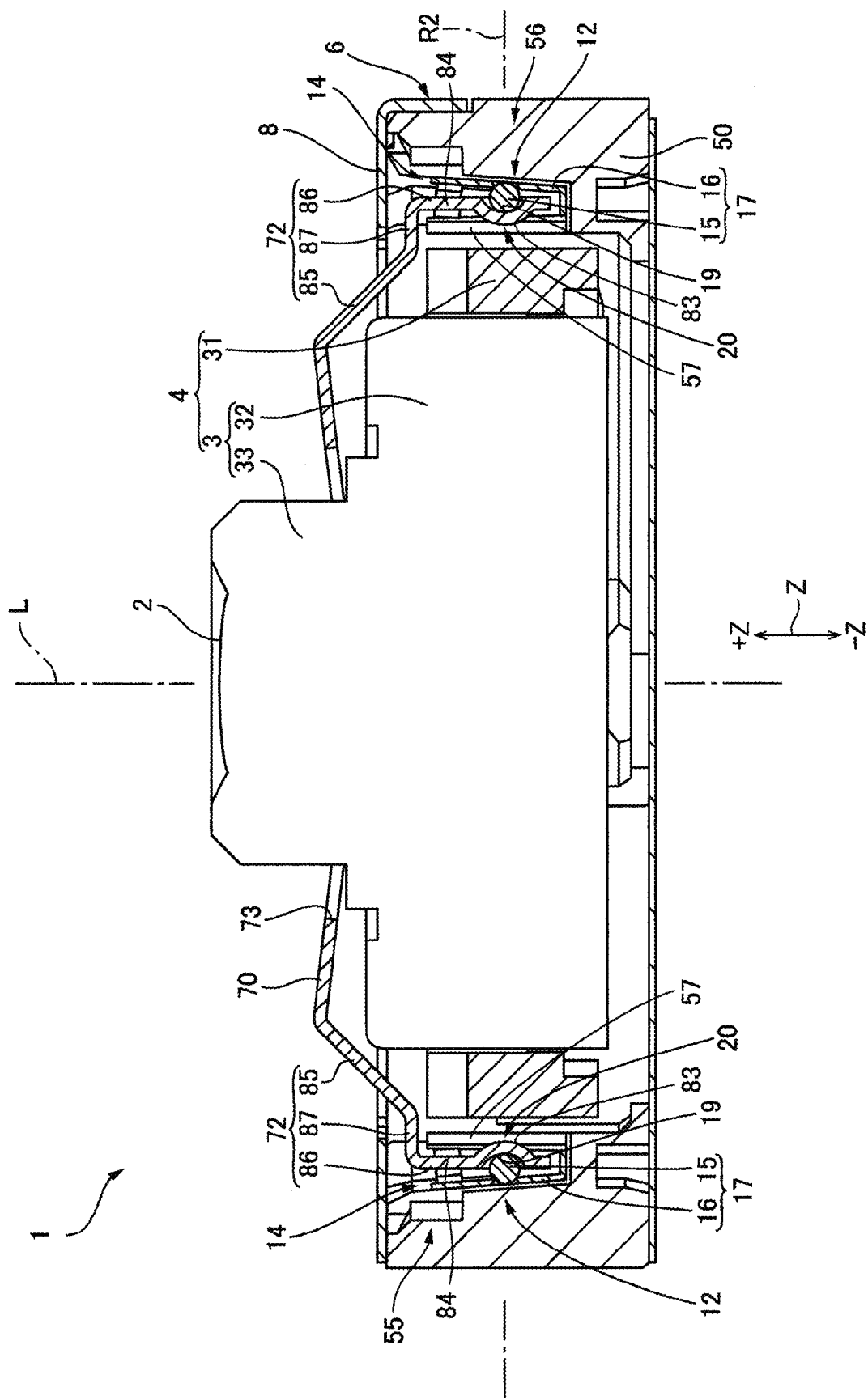
FIG. 6 is a cross-sectional view taken along a line B-B in FIG. 2.

FIG. 1 is a perspective view of an optical unit with a shake correction function. FIG. 2 is a subject-side plan view of an optical unit with a shake correction function from which a cover is removed. FIG. 3 is an exploded perspective view of an optical unit with a shake correction function. FIG. 4 is a perspective view of a gimbal mechanism. FIG. 5 is a cross-sectional view taken along a line A-A in FIG. 2. That is, FIG. 5 is a cross-sectional view of the optical unit with a shake correction function, which is cut along a first axis. FIG. 6 is a cross-sectional view taken along a line B-B in FIG. 2. That is, FIG. 6 is a cross-sectional view of the optical unit with a shake correction function, which is cut along a second axis.

As shown in FIGS. 1 and 2, an optical unit 1 with a shake correction function of the present embodiment includes a camera module 3 including optical elements such as a lens 2 and the like. The optical unit 1 with the shake correction function is mounted on, for example, a mobile phone with a camera, an imaging device such as a drive recorder, or an action camera or a wearable camera mounted on a mobile body such as a helmet, a bicycle, a radio-controlled helicopter or the like. In these optical devices, in a case where the optical device is tilted during an imaging process, the camera module 3 is tilted and a captured image is distorted. In order to avoid distortion of the captured image, the optical unit 1 with the shake correction function corrects the tilt of the camera module 3 based on an acceleration, an angular velocity, an amount of shake and the like detected by a detection means such as a gyroscope or the like.

In the following description, three axes orthogonal to one another are defined as an X-axis, a Y-axis and a Z-axis. Further, a direction along the X-axis is defined as an X-axis direction, one side of the X-axis direction is defined as a −X direction, and the other side of the X-axis direction is defined as +X direction. A direction along the Y-axis is defined as a Y-axis direction, one side of the Y-axis direction is defined as a −Y direction, and the other side of the Y-axis direction is defined as +Y direction. A direction along the Z-axis is defined as a Z-axis direction, one side of the Z-axis direction is defined as a −Z direction (a first direction), and the other side of the Z-axis direction is defined as +Z direction (a second direction). The Z-axis direction is an optical axis direction extending along an optical axis L of the camera module 3. The −Z direction is an image side of the camera module 3, and the +Z direction is a subject side of the camera module 3.

As shown in FIG. 1, the optical unit 1 with the shake correction function includes a movable body 4 including the camera module 3, a gimbal mechanism 5 configured to rotatably support the movable body 4, a fixed body 6 configured to support the movable body 4 via the gimbal mechanism 5, a shake correction drive mechanism 7 configured to swing the movable body 4 with respect to the fixed body 6, and a rectangular frame-shaped cover 8 configured to cover the fixed body 6 from the +Z direction side. The optical unit 1 with the shake correction function performs the shake correction by swinging the movable body 4 around two axes that intersect with the optical axis L of the camera module 3 and intersect with each other. In the present embodiment, the optical unit 1 with the shake correction function performs shake correction by swinging the movable body 4 around two axes orthogonal to the optical axis L of the camera module 3 and orthogonal to each other. That is, in the optical unit 1 with the shake correction function, a shake correction in a pitching direction and a shake correction in a yawing direction are performed by performing a shake correction around the X-axis and a shake correction around the Y-axis.

The movable body 4 is supported by the gimbal mechanism 5 such that the movable body is rotatable around a first axis R1 orthogonal to the optical axis L and rotatable around a second axis R2 orthogonal to the optical axis L and the first axis RE The first axis R1 and the second axis R2 are inclined 45 degrees with respect to the X axis and the Y axis. By synthesizing a rotation around the first axis R1 and a rotation around the second axis R2, the movable body 4 rotates around the X axis and the Y axis.

As shown in FIG. 2 and FIG. 4, the gimbal mechanism 5 includes a gimbal frame 10, first connection mechanisms 11 provided at diagonal positions on the first axis R1 of the movable body 4, and second connection mechanisms 12 provided at diagonal positions on the second axis R2 of the fixed body 6. The gimbal frame 10 is a metal-made plate spring. The first connection mechanisms 11 connect the gimbal frame 10 and the movable body 4 such that the gimbal frame and movable body are rotatable around the first axis RE The second connection mechanisms 12 connect the gimbal frame 10 and the fixed body 6 such that the gimbal frame 10 and the fixed body are rotatable around the second axis R2.

Each of the first connection mechanisms 11 includes a gimbal frame receiving member 17 including a metal-made sphere 15 and a metal-made thrust receiving member 16 to which the sphere 15 is fixed, and a support portion 20 having a concave curved surface 19 configured to make contact with the sphere 15. The gimbal frame receiving member 17 is held by a holding portion 13 provided on the movable body 4. Each of the second connection mechanisms 12 includes a gimbal frame receiving member 17 including a metal-made sphere 15 and a metal-made thrust receiving member 16 to which the sphere 15 is fixed, and a support portion 20 having a concave curved surface 19 configured to make contact with the sphere 15. The gimbal frame receiving member 17 is held by a holding portion 14 provided at the fixed body 6.

In this regard, the gimbal frame receiving member 17 held by the holding portion 13 of the movable body 4 and the gimbal frame receiving member 17 held by the holding portion 14 of the fixed body 6 are the same members. Therefore, they will be described by designating them with like reference numerals. Further, the support portion 20 having the concave curved surface 19 configured to make contact with the gimbal frame receiving member 17 held by the movable body 4 and the support portion 20 having the concave curved surface 19 configured to make contact with the gimbal frame receiving member 17 held by the fixed body 6 have the same configuration. Therefore, they will be described by designating them with like reference numerals.

As shown in FIG. 2, the shake correction drive mechanism 7 includes a first magnetic drive mechanism 7X configured to generate a driving force that drives the movable body 4 around the X axis, and a second magnetic drive mechanism 7Y configured to generate a driving force that drives the movable body 4 around the Y axis 4. The first magnetic drive mechanism 7X is arranged on the −Y direction side of the movable body 4. The second magnetic drive mechanism 7Y is arranged on the −X direction side of the movable body 4. As shown in FIG. 3, the first magnetic drive mechanism 7X includes a set of magnet 25X and coil 26X. The second magnetic drive mechanism 7Y includes a set of magnet 25Y and coil 26Y. The magnet 25X and the coil 26X of the first magnetic drive mechanism 7X face each other in the Y-axis direction. The magnet 25Y and the coil 26Y of the second magnetic drive mechanism 7Y face each other in the X-axis direction. In the present embodiment, the magnets 25X and 25Y are arranged on the movable body 4, and the coils 26X and 26Y are arranged on the fixed body 6. Alternatively, the magnets 25X and 25Y may be arranged on the fixed body 6, and the coils 26X and 26Y may be arranged on the movable body 4.

(Movable Body)

As shown in FIG. 3 and FIG. 5, the movable body 4 includes a camera module 3 and a frame-shaped holder 31 configured to surround the camera module 3. The camera module 3 includes a main body portion 32 having an octagonal shape when viewed from the Z-axis direction, and a lens barrel portion 33 projecting from a central part of the main body portion 32 toward the second direction. The camera module 3 includes a lens 2 held in the lens barrel portion 33 and an image sensor (not shown) accommodated in the main body portion 32. The image sensor is arranged on the optical axis L of the lens 2. The holder 31 is made of a resin.

As shown in FIG. 3, the holder 31 includes a first side plate portion 35 extending in the Y-axis direction along the side surface of the main body portion 32 of the camera module 3 on the −X direction side of the camera module 3, and a second side plate portion 36 extending in the Y-axis direction along the side surface of the main body portion 32 on the +X direction side of the camera module 3. Further, the holder 31 includes a third side plate portion 37 extending in the X-axis direction along the side surface of the main body portion 32 on the −Y direction side of the camera module 3, and a fourth side plate portion 37 extending in the X-axis direction along the side surface of the main body portion 32 on the +Y direction side of the camera module 3. Moreover, the holder 31 includes a first corner portion 39 configured to connect the first side plate portion 35 and the third side plate portion 37, and a second corner portion 40 configured to connect the second side plate portion 36 and the fourth side plate portion 38. The first corner portion 39 and the second corner portion 40 are located diagonally in the first axial R1 direction. In addition, the holder 31 includes a third corner portion 41 configured to connect the first side plate portion 35 and the fourth side plate portion 38, and a fourth corner portion 42 configured to connect the second side plate portion 36 and the third side plate portion 37. The third corner portion 41 and the fourth corner portion 42 are located diagonally in the second axial R2 direction. The third corner portion 41 and the fourth corner portion 42 have a plate shape and extend along the side surface of the main body portion 32.

The magnet 25Y of the second magnetic drive mechanism 7Y is fixed to an outer surface of the first side plate portion 35 via a plate-shaped yoke member 44. The magnet 25X of the first magnetic drive mechanism 7X is fixed to an outer surface of the third side plate portion 37 via a plate-shaped yoke member 44. The yoke member 44 is made of a magnetic material. The magnets 25X and 25Y are magnetized so that magnetic poles of the surfaces facing outward in a radial direction are different with respect to a magnetizing polarization line extending in the circumferential direction at the center in the Z-axis direction.

Holding portions 13 configured to hold the gimbal frame receiving members 17 of the first connection mechanisms 11 are provided at the first corner portion 39 and the second corner portion 40. Each of the holding portions 13 is a cutout recess cut out from the +Z direction side and the side of the optical axis L (one side in the first axial R1 direction) of the holder 31. Each of the holding portions 13 is opened on the inner peripheral side in the +Z direction and the first axial R1 direction. In addition, the holder 31 includes a pair of facing wall portions 45 formed in the first corner portion 39 and the second corner portion 40, respectively, and configured to partially close the openings on the inner peripheral side of the holding portions 13.

(Fixed Body)

As shown in FIG. 3, the fixed body 6 includes a resin-made case 50 and coils 26X and 26Y held in the case 50. The case 50 has a rectangular frame shape that surrounds an outer peripheral side of the movable body 4.

The case 50 includes a first frame portion 51 extending in the Y-axis direction on the −X direction side of the fixed body 6, a second frame portion 52 extending in the Y-axis direction on the +X direction side of the fixed body 6, a third frame portion 53 extending in the X-axis direction on the −Y direction side of the fixed body 6, and a fourth frame portion 54 extending in the X-axis direction on the +Y direction side of the fixed body 6. In the case 50, holding portions 14 configured to hold the gimbal frame receiving members 17 of the second connection mechanisms 12 are provided at the first corner portion 55 and the second corner portion 56 diagonal to each other in the second axial R2 direction. The first corner portion 55 is a connection part configured to connect the first frame portion 51 and the fourth frame portion 54, and the second corner portion 56 is a connection part configured to connect the third frame portion 53 and the second frame portion 52. Each of the holding portions 14 is a cutout recess cut out from the +Z direction side and the side of the optical axis L (one side in the second axial R2 direction) of the case 50. Each of the holding portions 14 is opened on the inner peripheral side in the +Z direction and the second axial R2 direction. In addition, the case 50 includes a pair of facing wall portions 57 formed in the first corner portion 55 and the second corner portion 56, respectively, and configured to partially close the openings on the inner peripheral side of the holding portions 14.

As shown in FIG. 3, the first frame portion 51 and the third frame portion 53 are provided with coil arrangement holes 58. Each of the coil arrangement holes 58 is a through-hole, and the coil 26X of the first magnetic drive mechanism 7X and the coil 26Y of the second magnetic drive mechanism 7Y are fixed in the coil arrangement hole 58 by an adhesive. The coils 26X and 26Y are oval air-core coils elongated in the circumferential direction, and two long sides located on the +Z direction side and the −Z direction side are used as effective sides. A flexible printed substrate 60 is fixed to radial outer sides of the first frame portion 51 and the third frame portion 53. The flexible printed substrate 60 includes a first substrate part 61 that overlaps with the coil arrangement hole 58 of the third frame portion 53 from the radial outer side, and a second substrate part 62 that overlaps with the coil arrangement hole 58 of the first frame portion 51 from the radial outer side. The coil 26X is fixed to the first substrate part 61, and the coil 26Y is fixed to the second substrate part 62. The coil 26X and the coil 26Y are electrically connected to the flexible printed substrate 60.

Rectangular magnetic plates 64 are arranged between the first substrate part 61 and the coil 26X and between the second substrate part 62 and the coil 26Y, respectively. The magnetic plate 64 arranged between the first substrate part 61 and the coil 26X faces the magnet 25X, and constitutes a magnetic spring configured to return the movable body 4 to a reference rotation position in the rotation direction around the X axis. Further, the magnetic plate 64 arranged between the second substrate part 62 and the coil 26Y faces the magnet 25Y, and constitutes a magnetic spring configured to return the movable body 4 to a reference rotation position in the rotation direction around the Y axis. Further, magnetic sensors 65 are arranged at the positions overlapping with center holes of the coils 26X and 26Y. The magnetic sensors 65 are, for example, Hall elements. The optical unit 1 with the shake correction function detects a swing angle of the movable body 4 around the X axis from an output of the magnetic sensor 65 arranged at a center of the coil 26X. Further, the optical unit 1 with the shake correction function detects a swing angle of the movable body 4 around the Y axis from an output of the magnetic sensor 65 arranged at a center of the coil 26Y.

(Gimbal Frame)

As shown in FIGS. 3 and 4, the gimbal frame 10 includes a gimbal frame main body 70 having a substantially square shape when viewed from the Z-axis direction, first gimbal frame extension portions 71 bending radially outward in the −Z direction from the diagonal positions in the first axial R1 direction in the gimbal frame main body 70 and extending in the Z-axis direction, and second gimbal frame extension portions 72 bending radially outward in the −Z direction from the diagonal positions in the second axial R2 direction in the gimbal frame main body 70 and extending in the Z-axis direction. At a center of the gimbal frame main body 70, there is provided a central hole 73 penetrating the gimbal frame main body 70. As shown in FIG. 2, the gimbal frame main body 70 overlaps with the main body 32 of the camera module 3 when viewed from the Z-axis direction.

As shown in FIG. 4, the gimbal frame main body 70 includes a rectangular central plate part 75 extending in the first axial R1 direction from a center in the second axial R2 direction, and a pair of trapezoidal corner plate parts 76 inclined in the +Z direction from the central plate part 75 toward opposite sides in the second axial R2 direction. In the gimbal frame main body 70, the corner plate parts 76 in the second axial R2 direction are spaced apart from the movable body 4 more than the central plate part 75. Therefore, even when the movable body 4 rotates around the first axis R1 on the −Z direction side of the gimbal frame 10 such that opposite ends of the movable body 4 in the second axial R2 direction move in the Z-axis direction, it is possible to avoid collision of the movable body 4 with the gimbal frame 10.

As shown in FIGS. 3 and 5, the first gimbal frame extension portion 71 includes a first gimbal frame extension portion first extension part 81 inclined toward the first direction from the central plate part of the gimbal frame main body 70 toward the first axis R1, and a first gimbal frame extension portion second extension part 82 extending in the Z-axis direction on a first direction side of the first gimbal frame extension portion first extension part 81. The first gimbal frame extension portion 71 includes a support portion 20 provided at a first direction tip of the first gimbal frame extension portion second extension part 82 and configured to constitute the first connection mechanism 11. The support portion 20 includes a concave curved surface 19 recessed radially inward at a circumferential center part of a radial outer end surface. Further, the support portion 20 includes a convex curved surface 83 protruding radially inward at a circumferential center part of a radial inner end surface. The convex curved surface 83 is formed on the end surface opposite to the end surface on which the concave curved surface 19 is formed, when the concave curved surface 19 is formed on the first gimbal frame extension portion second extension part 82 by press working. The convex curved surface 83 is provided at a position corresponding to the concave curved surface 19. In this regard, the concave curved surface 19 has a radius of curvature larger than a radius of curvature of the sphere 15 constituting the first connection mechanism 11. In addition, the first gimbal frame extension portion second extension part 82 includes a passage portion 84 formed on the +Z direction side of the support portion 20 and having a circumferential width narrower than that of the support portion 20.

As shown in FIG. 3 and FIG. 6, the second gimbal frame extension portion 72 includes a second gimbal frame extension portion first extension part 85 inclined toward the first direction from each of the pair of corner plate parts 76 of the gimbal frame main body portion 70 toward the second axis R2, a second gimbal frame extension portion second extension part 86 extending in the Z-axis direction from a first direction end of the second gimbal frame extension portion first extension part 85, and a second gimbal frame extension portion third extension part 87 extending in the second axial R2 direction between the second gimbal frame extension portion first extension part 85 and the second gimbal frame extension portion second extension part 86 to connect the second gimbal frame extension portion first extension part 85 and the second gimbal frame extension portion second extension part 86. The second gimbal frame extension portion 72 includes a support portion 20 provided a the first direction tip of the second gimbal frame extension portion second extension part 86 and configured to constitute the second connection mechanism 12. The support portion 20 includes a concave curved surface 19 recessed radially inward at a circumferential center part of a radial outer end surface. Further, the support portion 20 includes a convex curved surface 83 protruding radially inward at a circumferential center part of a radial inner end surface. The convex curved surface 83 is formed on an end surface opposite to the end surface on which the concave curved surface 19 is formed, when the concave curved surface 19 is formed on the support portion 20 by press working. The convex curved surface 83 is provided at a position corresponding to the concave curved surface 19. In this regard, the concave curved surface 19 has a radius of curvature larger than the radius of curvature of the sphere 15 constituting the second connection mechanism 12. In addition, the second gimbal frame extension portion second extension part 86 includes a passage portion 84 formed on the +Z direction side of the support portion 20 and having a circumferential width narrower than that of the support portion 20.

In this regard, the sphere 15 of the gimbal frame receiving member 17 held by each of the holding portions 13 of the movable body 4 makes contact with the support portion 20 of each of the first gimbal frame extension portions 71. Thus, as shown in FIGS. 2 and 5, there is provided the first connection mechanism 11 configured to connect the gimbal frame 10 and the movable body 4 such that the gimbal frame 10 and the moveable body 4 are rotatable around the first axis R1. More specifically, as shown in FIG. 5, the holding portion 13 of the movable body 4 holds the gimbal frame receiving member 17 at a position where the first axis R1 passes through the center of the sphere 15. The sphere 15 is partially inserted into the concave curved surface 19 of the support portion 20 of the first gimbal frame extension portion 71 in the first axial R1 direction. Thus, the concave curved surface 19 and the sphere 15 come into a state in which they make point-to-point contact with each other on the first axis R1. Therefore, the movable body 4 and the gimbal frame 10 are connected in a state in which they are rotatable around the first axis R1.

Furthermore, the sphere 15 of the gimbal frame receiving member 17 held by each of the holding portions 14 of the fixed body 6 makes contact with the support portion 20 of each of the second gimbal frame extension portions 72. Thus, as shown in FIGS. 2 and 6, there is provided the second connection mechanism 12 configured to connect the gimbal frame 10 and the fixed body 6 such that the gimbal frame 10 and the fixed body 6 are rotatable around the second axis R2. More specifically, as shown in FIG. 6, the holding portion 14 of the fixed body 6 holds the gimbal frame receiving member 17 at a position where the second axis R2 passes through the center of the sphere 15. The sphere 15 is partially inserted into the concave curved surface 19 of the support portion 20 of the second gimbal frame extension portion 72 in the second axial R2 direction. Thus, the concave curved surface 19 and the sphere 15 come into a state in which they make point-to-point contact with each other on the second axis R2. Therefore, the fixed body 6 and the gimbal frame 10 are connected in a state in which they are rotatable around the second axis R2.

(Details of First Connection Mechanism and Second Connection Mechanism)

Figure 7:
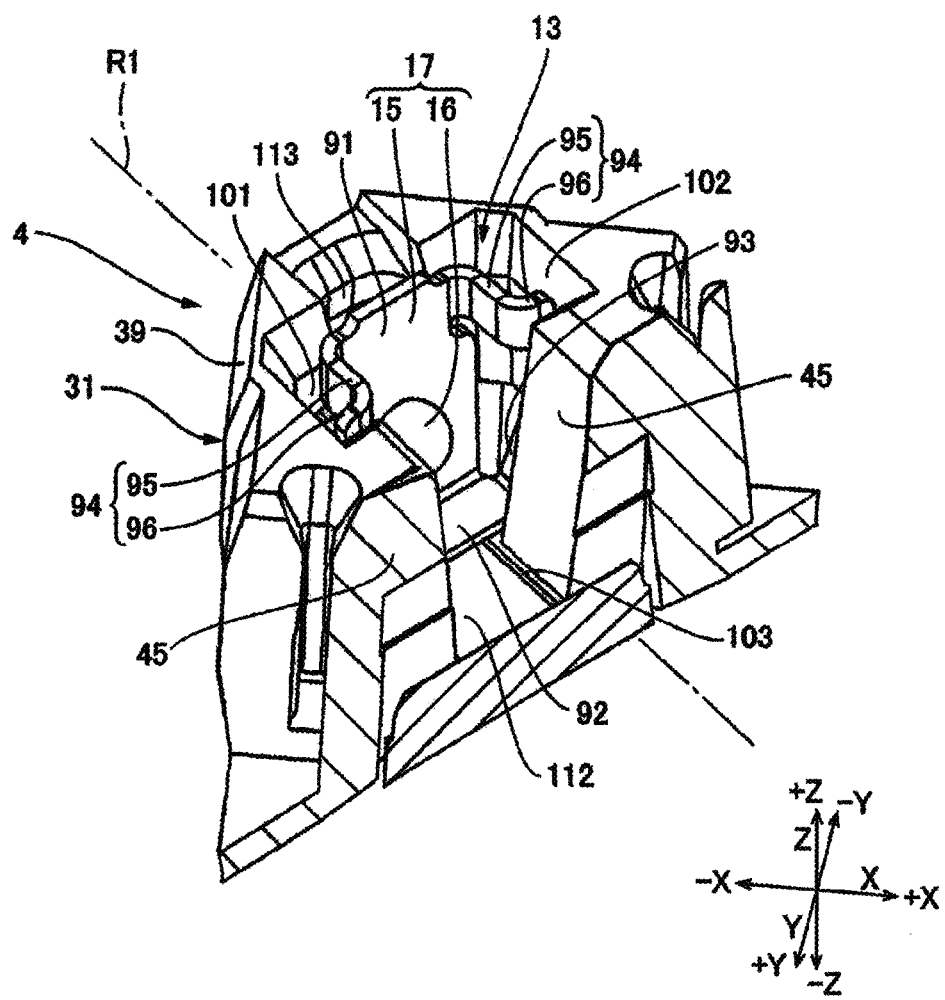
FIG. 7 is a perspective view of a holding portion of a movable body configured to hold a gimbal frame receiving member.
Figure 8:
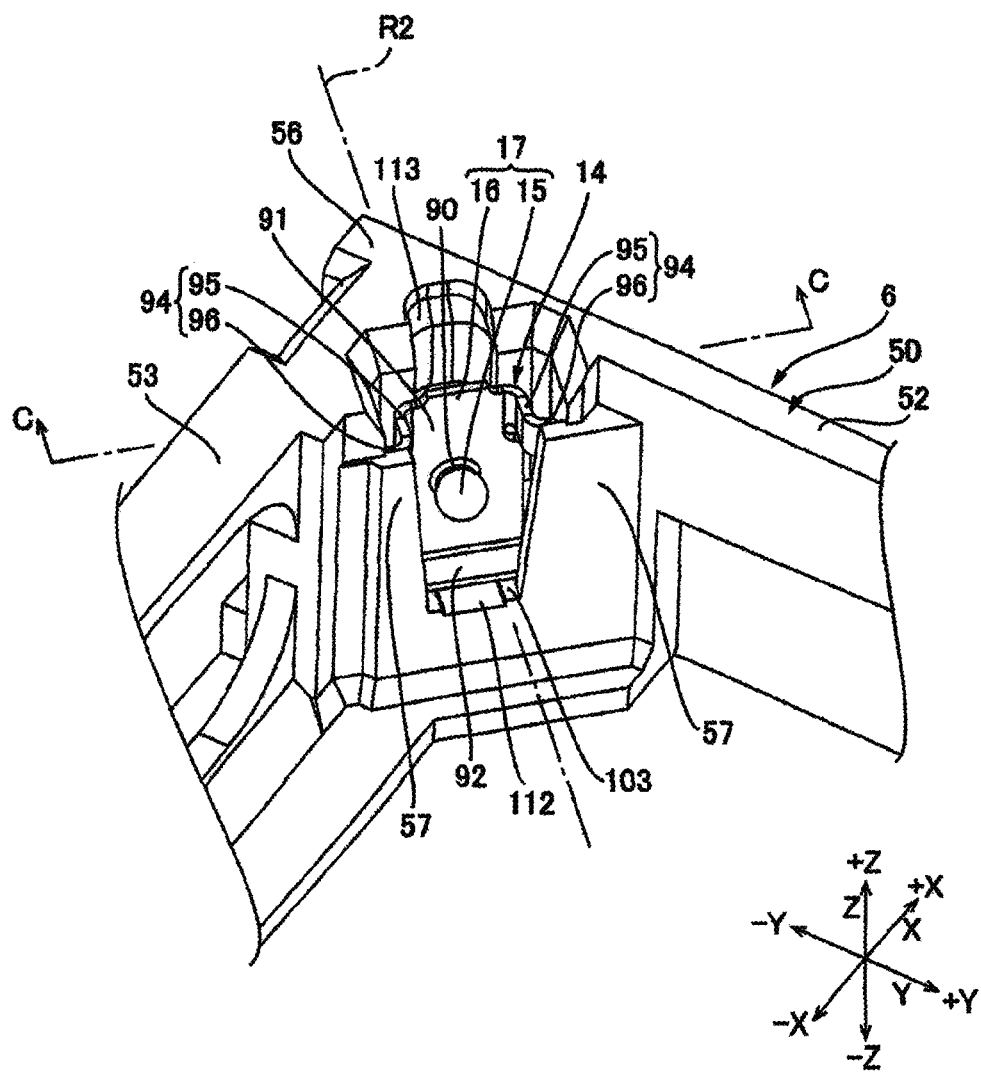
FIG. 8 is a perspective view of a holding portion of a fixed body configured to hold a gimbal frame receiving member.
Figure 9:
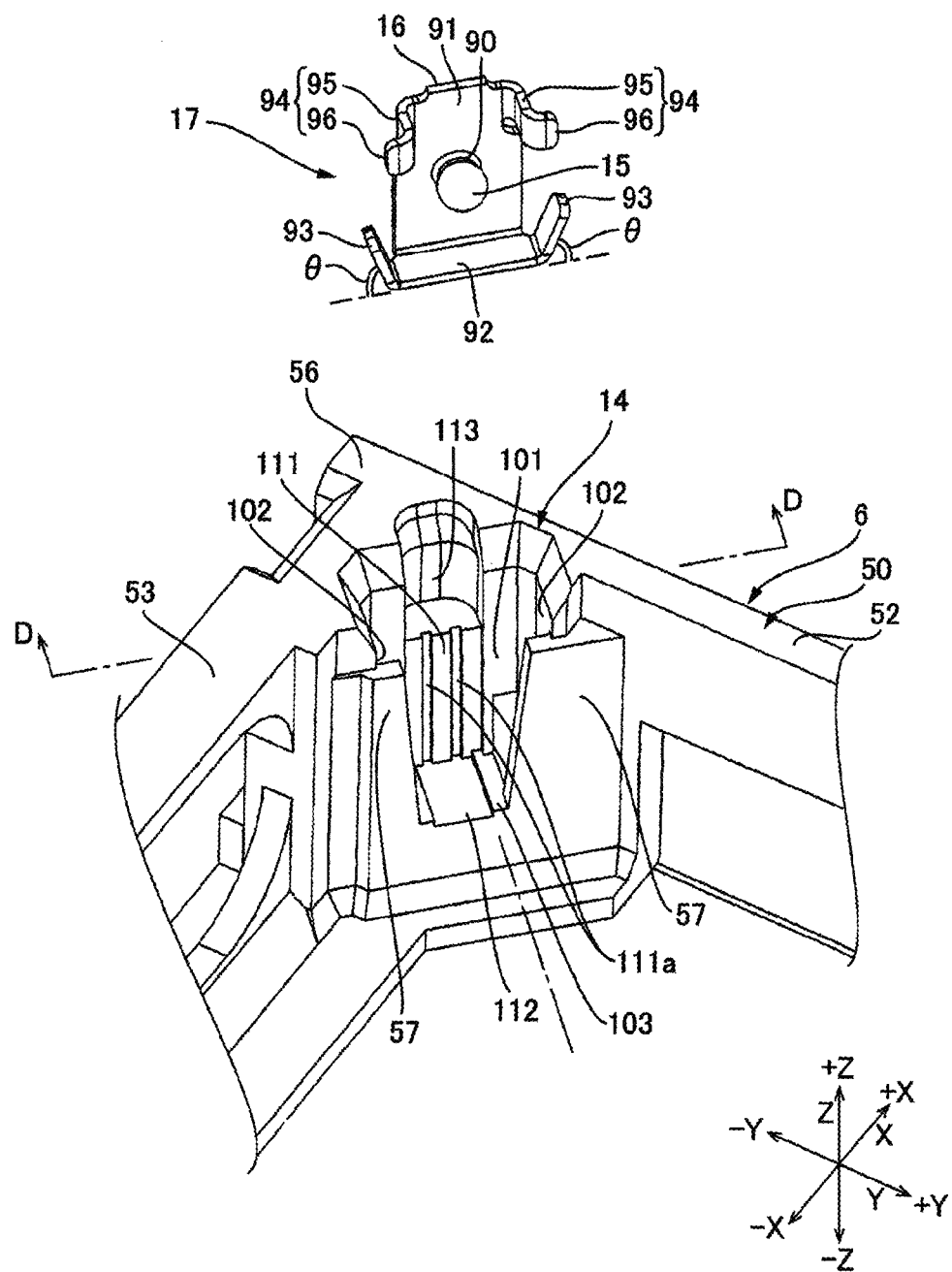
FIG. 9 is an exploded perspective view of a gimbal frame receiving member and a holding portion.
Figure 10:
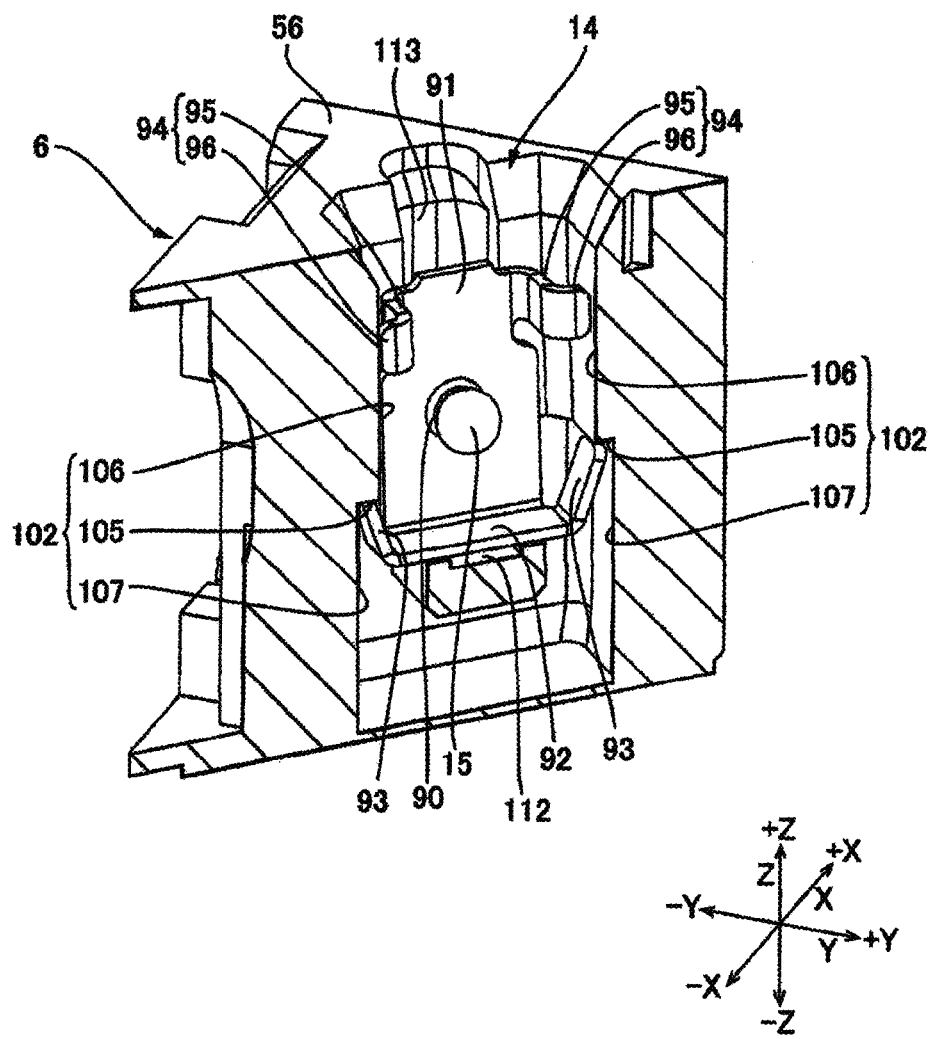
FIG. 10 is a cross-sectional view taken along a line C-C in FIG. 8.
Figure 11:
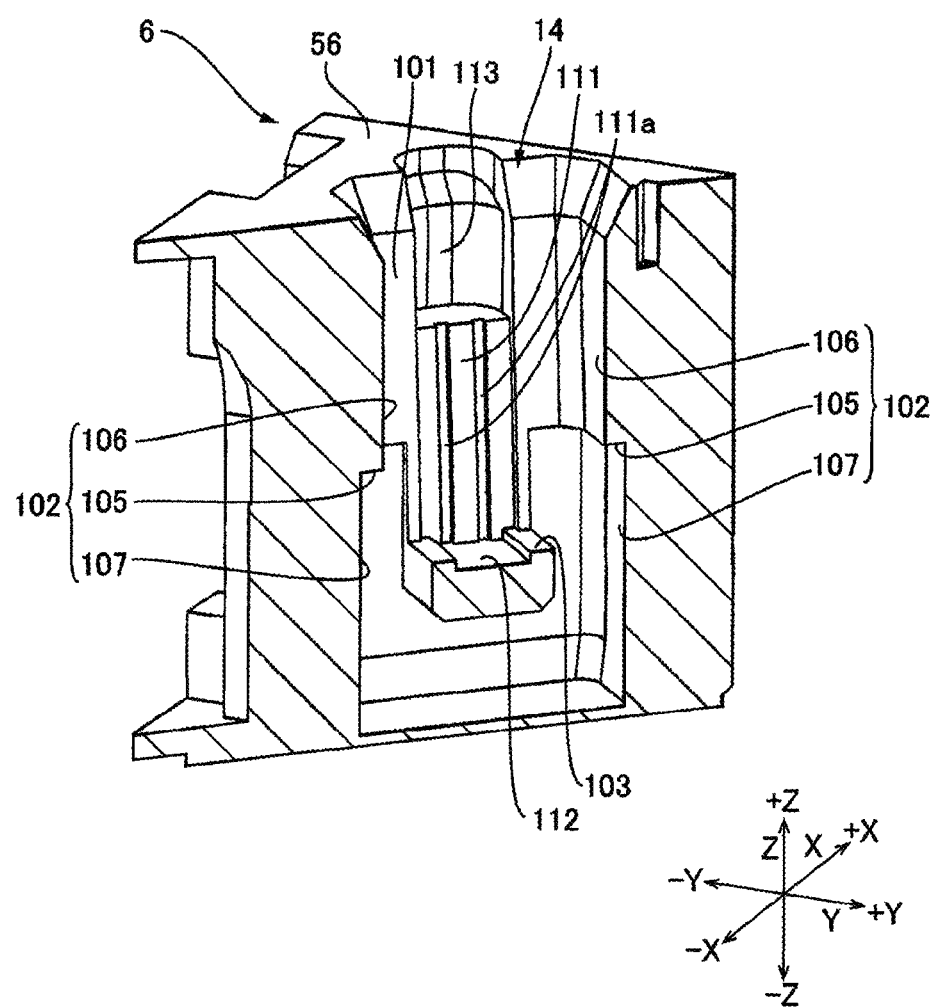
FIG. 11 is a cross-sectional view taken along a line D-D in FIG. 9.
Figure 12:
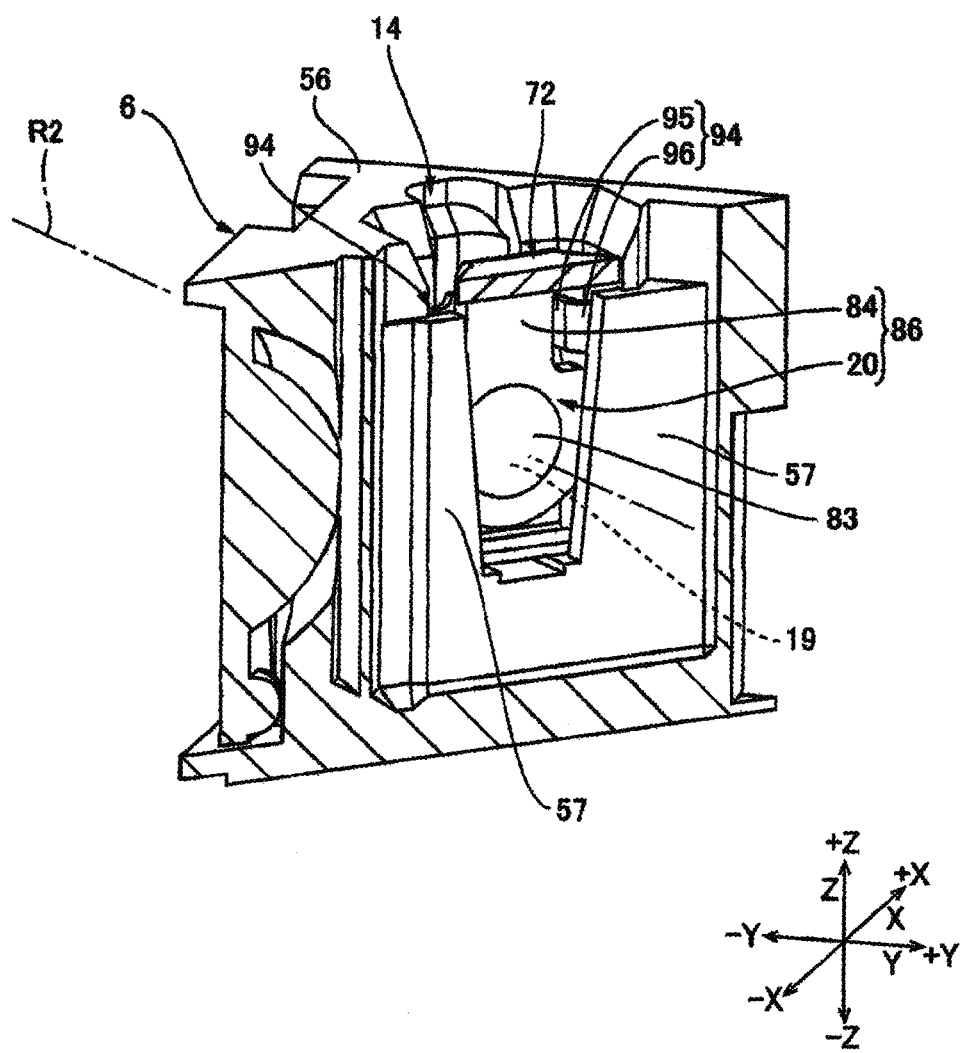
FIG. 12 is a cross-sectional view taken along a line E-E in FIG. 2.

Next, the first connection mechanism 11 and the second connection mechanism 12 will be described in more detail. FIG. 7 is a perspective view of the holding portion 13 of the movable body 4 that holds the gimbal frame receiving member 17. FIG. 7 shows a case where the first corner portion 39 of the holder 31 of the movable body 4 in the first axial R1 direction is cut along a plane perpendicular to the first axis RE FIG. 8 is a perspective view of the holding portion 14 of the fixed body 6 that holds the gimbal frame receiving member 17. FIG. 8 shows a case where the holding portion 14 of the fixed body 6 is viewed from the inner peripheral side where the optical axis L is located. FIG. 9 is a perspective view showing a state in which the gimbal frame receiving member 17 is removed from the holding portion 14 of the fixed body 6. FIG. 10 is a cross-sectional view taken along a line C-C in FIG. 8. FIG. 11 is a sectional view taken along a line D-D in FIG. 9. FIG. 12 is a sectional view taken along a line E-E in FIG. 2.

Further, the first connection mechanism 11 and the second connection mechanism 12 have corresponding configurations. That is, the holding portion 13 of the movable body 4 is provided on the first axis R1, and the holding portion 14 of the fixed body 6 is provided on the second axis R2. Except for such an arrangement, the holding portions 13 and 14 have the same configuration. Further, the gimbal frame receiving members 17 held by the holding portions 13 and 14 are the same member. Therefore, the second connection mechanism 12 configured to connect the fixed body 6 and the gimbal frame 10 will be described below. Regarding the first connection mechanism 11 configured to connect the movable body 4 and the gimbal frame 10, like reference numerals are given to the configurations corresponding to those of the second connection mechanism 12 in FIG. 8, and the description thereof will be omitted.

(Gimbal Frame Receiving Member)

As shown in FIGS. 8 and 9, the gimbal frame receiving member 17 includes a metal-made sphere 15 and a metal-made thrust receiving member 16 to which the sphere 15 is fixed. As shown in FIG. 9, the thrust receiving member 16 includes a base plate portion 91 including a sphere fixing portion 90 to which the sphere 15 is fixed, and a bent plate portion 92 that bends at a right angle from a first direction end of the base plate portion 91 in the first axial R1 direction. As shown in FIG. 4, the base plate portion 91 faces the support portion 20 of the second gimbal frame extension portion 72 via the sphere 15 in the second axial R2 direction. The bent plate portion 92 is located on the −Z direction side of the support portion 20, and is configured to face the support portion 20 in the Z-axis direction.

The plate portion 91 has a rectangular shape elongated in the Z-axis direction as a whole. A sphere fixing portion 90 is a circular through-hole provided at the circumferential center of the base plate portion 91. An inner diameter of the through-hole is smaller than the diameter of the sphere 15. The sphere 15 is fixed to the thrust receiving member 16 by welding in a state in which the sphere 15 is partially inserted into the sphere fixing portion 90.

Further, the thrust receiving member 16 includes a pair of locking plate portions 93 extending from opposite ends of the bent plate portion 92 in the circumferential direction. The locking plate portions 93 are located outside the base plate portion 91 in the circumferential direction. Each of the locking plate portions 93 is inclined from the bent plate portion 92 toward the +Z direction. As shown in FIG. 9, the inclination angle θ at which each of the locking plate portions 93 is inclined toward the +Z direction from a virtual vertical plane perpendicular to the optical axis L is larger than 45 degrees.

Further, the thrust receiving member 16 includes a pair of protrusion portions 94 protruding from circumferential opposite ends of the base plate portion 91 on the +Z direction side of the sphere fixing portion 90 toward the side where the support portion 20 is located in the second axial R2 direction. The protrusion portions 94 face each other in the circumferential direction. As shown in FIG. 9, each of the protrusion portions 94 includes a protrusion plate part 95 that bends in the second axial R2 direction from each of the circumferential opposite ends of the base plate portion 91, and an extension plate part 96 that bends from an end of the protrusion plate part 95 opposite to the base plate portion 91 toward the side opposite to the base plate portion 91 in the circumferential direction.

Next, as shown in FIG. 11, the holding portion 14 is a cutout recess portion that includes a back wall surface 101 extending in the Z-axis direction and the circumferential direction, a pair of side wall surfaces 102 extending in the optical axis direction at the circumferential opposite sides of the back wall surface 101 and facing each other in the circumferential direction, and a bottom wall surface 103 extending in the second axial R2 direction on the −Z direction side of the back wall surface 101. The holding portion 14 is opened toward the +Z direction side and the inner peripheral side in the second axial R2 direction (the side of the optical axis L). As shown in FIGS. 10 and 11, each of the pair of side wall surfaces 102 includes a pair of locked surface parts 105 extending in the circumferential direction at the positions spaced apart from the bottom wall surface 103 in the +Z direction. In the present embodiment, each of the locked surface parts 105 is parallel to the bottom wall surface 103 and perpendicular to the Z axis. Further, the side wall surfaces 102 include opening side surface parts 106 extending toward the +Z direction from the ends of the locked surface parts 105 on the side of the base plate portion 91 and facing each other in the circumferential direction, and bottom wall surface side surface parts 107 extending toward the −Z direction from the ends of the locked surface parts 105 opposite to the base plate portion 91 and facing each other in the circumferential direction.

As shown in FIG. 11, an adhesive-filling first groove 111 is provided at a circumferential center part of the back wall surface 101. An adhesive-applying second groove 112 is provided at a circumferential center part of the bottom wall surface 103. A deep adhesive injection portion 113 is formed at an outer side in the radial direction on the +Z side end part of the first groove 111. The first groove 111 and the second groove 112 are in communication with each other. Further, the first groove 111 is provided with two fine grooves 111a extending in parallel in the Z-axis direction. The two fine grooves 111a are also in communication with the second groove 112.

In this regard, when assembling the optical unit 1 with the shake correction function, as shown in FIG. 4, the gimbal frame receiving member 17 comes into a state in which the concave curved surface 19 of the support portion 20 of the second gimbal frame extension portion 72 is brought into contact with the sphere 15. The gimbal frame receiving member 17 is inserted into the holding portion 14 together with the second gimbal frame extension portion second extension part 86.

In a state in which the concave curved surface 19 of the support portion 20 of the second gimbal frame extension portion 72 and the sphere 15 are brought into contact with each other, the second gimbal frame extension portion second extension part 86 extends in the Z-axis via a region between the protrusion portions 94. More specifically, as shown in FIG. 4, the support portion 20 provided at the −Z direction tip of the of the second gimbal frame extension portion second extension part 86 is located on the −Z direction side of the protrusion portions 94, and the passage portion 84 is located between the protrusion portions 94. In this regard, a circumferential width dimension of the support portion 20 is larger than a circumferential width dimension of the passage portion 84, and is larger than a gap between the protrusion portions 94. Therefore, when viewed from the Z-axis direction, the protrusion portions 94 overlap with the circumferential opposite end parts of the support portion 20.

When the gimbal frame receiving member 17 is inserted into the holding portion 14 from the +Z direction side together with the second gimbal frame extension portion second extension part 86 such that the thrust receiving member 16 is held by the holding portion 14, as shown in FIG. 10, the back wall surface 101 makes contact with the base plate portion 91 of the thrust receiving member 16 from the side opposite to the support portion 20 of the gimbal frame 10. The side wall surfaces 102 are located on the circumferential opposite sides of the base plate portion 91. Tips of the extension plate parts 96 of the protrusion portions 94 face the opening side surface parts 106 of the side wall surfaces 102 respectively. The tips of the extension plate portions 96 of the protrusion portions 94 may come into contact with the opening side surface part 106. The bottom wall surface 103 makes contact with the bent plate portion 92 from the −Z direction side.

In this regard, the first groove 111 and the second groove 112 are filled with an adhesive. That is, the adhesive is injected into the adhesive injection portion 113 of the first groove 111. The adhesive injected into the adhesive injection portion 113 flows into the second groove 112 via the first groove 111 and the two fine grooves 111a provided in the first groove 111. Thereafter, due to a surface tension of the adhesive, the adhesive stays at the tip part of the bent plate portion 92 of the thrust receiving member 16, and comes into a state in which the adhesive is raised toward the +Z direction side at the tip part of the bent plate portion 92. As a result, the thrust receiving member 16 is fixed to the holding portion 14 by the adhesive. In this regard, the first groove 111 is provided with two fine grooves 111a, and the adhesive also flows into these fine grooves 111a. Accordingly, it is possible to secure a contact area over which the back wall surface 101 of the holding portion 14 and the adhesive come into contact with each other. In addition, the adhesive injected into the two fine grooves 111a provides an anchor effect of preventing the adhesive from being peeled off from the holding portion 14 after the adhesive is cured.

Further, the +Z direction side end parts of the locking plate portions 93 face the locked surface parts 105 of the side wall surfaces 102 in the Z-axis direction respectively. The +Z direction side end parts of the locking plate portions 93 may be in contact with the locked surface parts 105 of the side wall surfaces 102, respectively.

In this regard, each of the locking plate portions 93 is locked to each of the locked surface portions 105 through the use of elasticity of the metal-made thrust receiving member 16 when the gimbal frame receiving member 17 is held by the holding portion 14. That is, when the thrust receiving member 16 is inserted into the holding portion 14 from the +Z direction side in order to have the gimbal frame receiving member 17 held in the holding portion 14, each of the locking plate portions 93 makes contact with the opening side surface part 106 and moves toward the −Z direction while being bent toward the base plate portion 91. Thereafter, when the bent plate portion 92 reaches the bottom wall surface 103, the contact between each of the locking plate portions 93 and the opening side surface part 106 is released such that each of the locking plate portions 93 extends to the side opposite to the base plate portion 91. As a result, each of the locking plate portions 93 comes into a state in which it faces each of the locked surface portions 105 from the −Z direction side. Thus, the locking plate portions 93 comes into a state in which they face bottom wall surface side surface parts 107 respectively. In addition, the locking plate portions 93 may come into contact with the bottom wall surface side surface parts 107.

In a state where the gimbal frame receiving member 17 is inserted into the holding portion 14 together with the second gimbal frame extension portion second extension part 86 to form the second connection mechanism 12, the gimbal frame 10 is bent in a direction in which the second gimbal frame extension portions 72 come close to each other in the second axial R2 direction. That is, the second gimbal frame extension portions 72 come into contact with the sphere 15 in a state in which they are bent toward the optical axis L.

As a result, each of the support portions 20 of the second gimbal frame extension portions 72 is biased toward the gimbal frame receiving member 17 held in the holding portion 14 by a shape restoring force of the gimbal frame 10. Accordingly, the contact between the sphere 15 and the concave curved surface 19 is maintained.

In this regard, as shown in FIGS. 8 and 9, the fixed body 6 includes a pair of facing wall portions 57 configured to partially seal the second axial R2 direction opening of the first holding portion 14 from the circumferential opposite sides. A gap is formed between the facing wall portions 57 in the circumferential direction. A radial outer surface of each of the facing wall portions 57 is continuous with the second axial R2 direction inner peripheral end of each of the side wall surfaces 102. In addition, the −Z direction end of the radial outer surface of each of the facing wall portions 57 is continuous with the bottom wall surface 103.

As shown in FIG. 8, the facing wall portions 57 face the pair of protrusion portions 94 of the thrust receiving member 16, the opposite side parts of the convex curved surface 83 in the support portion 20 of the second gimbal frame extension portion 72, and the bent plate portion 92 of the thrust receiving member 16 in the second axial R2 direction. In the second axial R2 direction, a dimension between the tips of the protrusion portions 94 and the facing wall portions 57, that is, a dimension between the facing wall portions 57 and the protrusion portions 94 is smaller than a thickness dimension of the second gimbal frame extension portion 72 in the second axial R2 direction.

Further, as shown in FIG. 2, in a state in which the gimbal frame receiving member 17 held by the holding portion 14 and the support portion 20 of the second gimbal frame extension portion 72 are connected in the second axial R2 direction, the convex curved surface 83 provided on the radial inner end surface of the support portion 20 is located between the facing wall portions 57 in the circumferential direction.

As shown in FIG. 7, the movable body 4 also includes a pair of facing wall portions 45 configured to partially seal the first axial R1 direction opening of the holding portion 13 from the circumferential opposite sides. The facing wall portions 45 correspond to the facing wall portions 57 of the fixed body 6. That is, a gap is formed between the facing wall portions 45 in the circumferential direction. The radial outer surface of each of the facing wall portions 45 is continuous with the second axial R2 direction inner peripheral end of each of the side wall surfaces 102. In addition, the −Z direction end of the radial outer surface of each of the facing wall portions 45 is continuous with the bottom wall surface 103.

The facing wall portions 45 face the pair of protrusion portions 94 of the thrust receiving member 16, the opposite side parts of the convex curved surface 83 in the support portion 20 of the first gimbal frame extension portion 71, and the bent plate portion 92 of the thrust receiving member 16 in the first axial R1 direction. In the first axial R1 direction, a dimension between the tips of the protrusion portions 94 and the facing wall portions 45, that is, a dimension between the facing wall portions 45 and the protrusion portions 94 is smaller than a thickness dimension of the first gimbal frame extension portion 71 in the first axial R1 direction. In a state in which the gimbal frame receiving member 17 held by the holding portion 13 and the support portion 20 of the first gimbal frame extension portion 71 are connected in the first axial R1 direction, the convex curved surface 83 provided on the radial inner end surface of the support portion 20 is located between the facing wall portions 45 in the circumferential direction.

(Effects of the Present Disclosure)

In the embodiments of the present disclosure, the fixed body 6 includes the holding portion 14 configured to hold the gimbal frame receiving member 17 at the position where the second axis R2 passes through the center of the sphere 15. The holding portion 14 is the cutout recess portion that includes the back wall surface 101 that makes contact with the base plate portion 91 from the side opposite to the support portion 20 in the second axial R2 direction, the pair of side wall surfaces 102 that face each other in the circumferential direction with the base plate portion 91 interposed therebetween, and the bottom wall surface 103 extending in the second axial R2 direction on the −Z direction side of the back wall surface 101 and making contact with the bent plate portion 92 from the −Z direction side. Further, as shown in FIG. 10, each of the side wall surfaces 102 includes the locked surface part 105 formed at the position spaced apart from the bottom wall surface 103 toward the +Z direction and extending in the circumferential direction to face each of the locking plate portions 93 from the +Z direction side. Similarly, as shown in FIG. 7, the movable body 4 includes the holding portion 13 configured to hold the gimbal frame receiving member 17 at the position where the first axis R1 passes through the center of the sphere 15. The thrust receiving member 16 includes the base plate portion 91 having the sphere fixing portion 90 to which the sphere 15 is fixed, the bent plate portion 92 bent in the first axial R1 direction from the −Z direction side end of the base plate portion 91 and located on the −Z direction side of the support portion 20, and the pair of locking plate portions 93 extending from circumferential opposite ends of the bent plate portion 92. The holding portion 13 is the cutout recess portion that includes the back wall surface 101 that makes contact with the base plate portion 91 from the side opposite to the support portion 20 in the first axial R1 direction, the pair of side wall surfaces 102 that face each other in the circumferential direction with the base plate portion 91 interposed therebetween, and the bottom wall surface 103 extending in the first axial R1 direction on the −Z direction side of the back wall surface 101 and making contact with the bent plate portion 92 from the −Z direction side. Each of the side wall surfaces 102 includes the locked surface part 105 formed at the position spaced apart from the bottom wall surface 103 toward the +Z direction and extending in the circumferential direction to face each of the locking plate portions 93 from the +Z direction side.

As a result, the bottom wall surface 103 of each of the holding portions 13 and 14 comes into contact with the bent plate portion 92 of the thrust receiving member 16 from the −Z direction side. Therefore, the thrust receiving member 16 does not fall off from the movable body 4 in the −Z direction. Further, the locked surface parts 105 provided on the pair of side wall surfaces 102 of each of the holding portions 13 and 14 make contact, from the +Z direction side, with the pair of locking plate portions 93 protruding from the bent plate portion 92 in the circumferential direction in the thrust receiving member 16. Accordingly, even in a case where the holding portions 13 and 14 configured to hold the thrust receiving member 16 are the cutout recesses opened toward the +Z direction, the thrust receiving member 16 does not fall off from the movable body 4 and the fixed body 6 in the +Z direction. Therefore, even when an impact is applied to the optical unit 1 with the shake correction function from the outside, the thrust receiving member 16 does not fall off from the movable body 4 and the fixed body 6 in the Z-axis direction.

Further, each of the locking plate portions 93 is inclined from the bent plate portion 92 toward the +Z direction, and the tip part thereof faces each of the locked surface parts 105. Therefore, it is easy to prevent each of the locking plate portions 93 locked to each of the locked surface parts 105 from coming off from each of the locked surface parts 105 in the +Z direction.

Further, the side wall surfaces 102 include the opening side surface parts 106 extending toward the +Z direction from the ends of the locked surface parts 105 on the side of the base plate portion 91 and facing each other in the circumferential direction, and the bottom wall surface side surface parts 107 extending toward the −Z direction from the ends of the locked surface parts 105 opposite to the base plate portion 91 and facing each other in the circumferential direction. Further, the tip part of each of the locking plate portions 93 faces the bottom wall surface side surface part 107 when the thrust receiving member 16 is held by the holding portion 14. Alternatively, the tip part of each of the locking plate portions 93 may come into contact with the bottom wall surface side surface part 107 when the thrust receiving member 16 is held by the holding portion 14. Therefore, when the thrust receiving member 16 is inserted into the holding portions 13 and 14 from the +Z direction side, each of the locking plate portions 93 can be caused to face each of the locked surface parts 105 by using the elasticity of the metal-made thrust receiving member 16.

In this regard, the inclination angle θ at which each of the locking plate portions 93 is inclined toward the +Z direction from the virtual vertical plane perpendicular to the optical axis is larger than 45 degrees. Therefore, when the thrust receiving member 16 is inserted from the +Z direction side, the locking plate portions 93 may be easily bent.

Further, each of the first gimbal frame extension portion 71 and the second gimbal frame extension portion 72 includes the support portion 20 provided at the −Z direction tip, and the passage portion 84 located between the protrusion portions 94 on the +Z direction side of the support portion 20. Further, the circumferential width dimension of the support portion 20 is larger than the circumferential width dimension of the passage portion 84, and is larger than the distance between the protrusion portions 94. Thus, when viewed from the Z-axis direction, the holding portions 13 and 14 of the first gimbal frame extension portion 71 and the second gimbal frame extension portion 72 overlap with the protrusions portions 94 respectively. As a result, when the first gimbal frame extension portion 71 and the second gimbal frame extension portion 72 move in the +Z direction, the support portion 20 and the protrusion portions 94 interfere with each other. Therefore, it is possible to prevent the first gimbal frame extension portion 71 and the second gimbal frame extension portion 72 from falling off from the thrust receiving member 16 in the +Z direction.

Further, each of the protrusion portions 94 includes the protrusion plate part 95 that bends in the second axial R2 direction from each of the circumferential ends of the base plate portion 91, and the extension plate part 96 that bends from the end of the protrusion plate part 95 opposite to the base plate portion 91 toward the side opposite to the base plate portion 91 in the circumferential direction. The circumferential end of each of the extension plate parts 96 faces each of the opening side surface parts 106 of the side wall surfaces 102. Further, the circumferential end of each of the extension plate portions 96 may come into contact with each of the opening side surface parts 106 of the side wall surfaces 102. Therefore, when the thrust receiving member 16 is held by the holding portions 13 and 14 respectively, the position of the thrust receiving member 16 can be regulated in the circumferential direction.

(Modification)

FIG. 13 is an explanatory view of a modification of the holding portions 13 and 14 and the thrust receiving member 16. FIG. 13 shows the holding portion 13 provided on the movable body 4. In this modification, each of the locking plate portions 93 of a thrust receiving member 16A has the same thickness dimension as the bent plate portion 92, and extends from the bent plate portion 92 in the circumferential direction without being bent. Other configurations except for the locking plate portions 93 are the same as those of the thrust receiving member 16 described above.

The holding portion 13A of this modification is a cutout recess portion that includes a back wall surface 101 extending in the Z-axis direction and the circumferential direction, a pair of side wall surfaces 102 extending in the Z-axis direction on the circumferential opposite sides of the back wall surface 101 and facing each other in the circumferential direction, and a bottom wall surface 103 extending in the second axial R2 direction on the −Z direction side of the back wall surface 101. The holding portion 13 is opened toward the +Z direction side and the inner peripheral side (the side of the optical axis L) in the second axial R2 direction. Each of the side wall surfaces 102 includes a pair of locked surface parts 105 extending in the circumferential direction at positions spaced apart from the bottom wall surface 103 in the +Z direction. In this modification, each of the locked surface portions 105 is parallel to the bottom wall surface 103 and perpendicular to the Z axis. In addition, the side wall surfaces 102 each are spaced apart from each other by the thickness dimension of the bent plate portion 92 in the Z-axis direction.

Further, in this modification, when the thrust receiving member 16 is held by the holding portion 13A of the movable body 4 and the holding portion 14 of the fixed body 6, the bottom wall surface 103 may be brought into contact with the bent plate portion 92 of the thrust receiving member 16 from the −Z direction side, and the locked surface part 105 may be brought into contact with each of the locking plate portions 93 from the +Z direction side. Accordingly, even when an impact is applied to the optical unit 1 with the shake correction function from the outside, the thrust receiving member 16 does not fall off from the movable body 4 and the fixed body 6 in the Z-axis direction.

According to the embodiments of the present disclosure, in the connection mechanism configured to connect the movable body and the gimbal frame via the sphere, it is possible to prevent the thrust receiving member to which the sphere is fixed from falling off from the movable body in the optical axis direction.

Further, according to embodiments of the present disclosure, in the second connection mechanism configured to connect the fixed body and the gimbal frame via the sphere, it is possible to prevent the thrust receiving member to which the sphere is fixed from falling off from the fixed body in the optical axis direction.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An optical unit with a shake correction function, comprising:
    a movable body including a camera module;
    a gimbal mechanism configured to support the movable body such that the movable body is swingable around a first axis intersecting an optical axis of the camera module and the movable body is swingable around a second axis intersecting the optical axis and the first axis; and
    a fixed body configured to support the movable body via the gimbal mechanism,
    wherein the gimbal mechanism includes a gimbal frame and a connection mechanism configured to connect the gimbal frame and the movable body such that the gimbal frame and the movable body are rotatable around the first axis,
    wherein the connection mechanism includes a gimbal frame receiving member including a sphere and a metal-made thrust receiving member to which the sphere is fixed, and a support portion having a concave curved surface making contact with the sphere,
    wherein the movable body includes a holding portion configured to hold the gimbal frame receiving member at a position where the first axis passes through a center of the sphere,
    wherein when a direction extending along the optical axis is defined as an optical axis direction, one side of the optical axis direction is defined as a first direction, the other side of the optical axis direction is defined as a second direction, a direction extending along the first axis is defined as a first axial direction, and a direction extending around the optical axis is defined as a circumferential direction, the thrust receiving member includes a base plate portion including a sphere fixing portion to which the sphere is fixed and facing the support portion via the sphere in the first axial direction, a bent plate portion bent in the first axial direction from a first direction end of the base plate portion and located on a first direction side of the support portion, and a pair of locking plate portions extending from circumferential opposite ends of the bent plate portion,
    wherein the holding portion is a cutout recess portion that includes a back wall surface configured to make contact with the base plate portion from a side opposite to the support portion in the first axial direction, a pair of side wall surfaces located at circumferential opposite sides of the back wall surface and configured to face each other in the circumferential direction, and a bottom wall surface extending in the first axial direction on a first direction side of the back wall surface and making contact with the thrust receiving member from a first direction side, the holding portion being opened toward a second direction side and one side of the first axial direction, and
    wherein the side wall surfaces each include locked surface parts formed at positions spaced apart from the bottom wall surface toward the second direction and extending in the circumferential direction to face the locking plate portions from the second direction side respectively.

2. The optical unit of claim 1, wherein the locking plate portions are inclined from the bent plate portion toward the second direction and have tip parts facing the locked surface parts.

3. The optical unit of claim 2, wherein each of the side wall surfaces includes opening side surface parts extending toward the second direction from ends of the locked surface parts on a side of the base plate portion and facing each other in the circumferential direction, and bottom wall surface side surface parts extending toward the first direction from ends of the locked surface parts opposite to the base plate portion and facing each other in the circumferential direction, and
wherein the locking plate portions have tip parts facing the bottom wall surface side surface parts.

4. The optical unit of claim 3, wherein an inclination angle at which each of the locking plate portions is inclined toward the second direction from a virtual vertical plane perpendicular to the optical axis is larger than 45 degrees.

5. The optical unit of claim 3, wherein the thrust receiving member includes a pair of protrusion portions protruding from circumferential opposite ends of the base plate portion on a second direction side of the sphere fixing portion toward a side where the support portion is located in the second axial direction and facing each other in the circumferential direction,
wherein the gimbal frame includes a gimbal frame extension portion extending in the optical axis direction via a region between the protrusion portions,
wherein the gimbal frame extension portion includes the support portion at a first direction side tip, and further includes a passage portion located between the protrusion portions on a second direction side of the support portion,
wherein a width dimension of the support portion in the circumferential direction is larger than a width dimension of the passage portion in the circumferential direction and larger than a gap between the protrusion portions, and
wherein the holding portion overlaps with the protrusion portions when viewed from the optical axis direction.

6. The optical unit of claim 5, wherein the protrusion portions each include protrusion plate parts bending in the first axial direction from the circumferential opposite ends of the base plate portion, and extension plate parts bending from ends of the protrusion plate parts opposite to the base plate portion toward sides opposite to the base plate portion in the circumferential direction, and
wherein the extension plate parts have circumferential ends facing the opening side surface parts of the side wall surfaces respectively.

7. The optical unit of claim 1, wherein each of the locking plate portions has the same thickness dimension as the bent plate portion and extends from the bent plate portion without being bent, and
wherein each of the locked surface parts and the bottom wall surface are parallel to each other and are spaced apart by the thickness dimension of the bent plate portion in the optical axis direction.

8. An optical unit with a shake correction function, comprising:
a movable body including a camera module;
a gimbal mechanism configured to support the movable body such that the movable body is swingable around a first axis intersecting an optical axis of the camera module and the movable body is swingable around a second axis intersecting the optical axis and the first axis; and
a fixed body configured to support the movable body via the gimbal mechanism,
wherein the gimbal mechanism includes a gimbal frame and a connection mechanism configured to connect the gimbal frame and the fixed body such that the gimbal frame and the fixed body are rotatable around the second axis,
wherein the connection mechanism includes a gimbal frame receiving member including a sphere and a metal-made thrust receiving member to which the sphere is fixed, and a support portion having a concave curved surface making contact with the sphere,
wherein the fixed body includes a holding portion configured to hold the gimbal frame receiving member at a position where the second axis passes through a center of the sphere,
wherein when a direction extending along the optical axis is defined as an optical axis direction, one side of the optical axis direction is defined as a first direction, the other side of the optical axis direction is defined as a second direction, a direction extending along the second axis is defined as a second axial direction, and a direction extending around the optical axis is defined as a circumferential direction, the thrust receiving member includes a base plate portion including a sphere fixing portion to which the sphere is fixed and facing the support portion via the sphere in the second axial direction, a bent plate portion bent in the second axial direction from a first direction side end of the base plate portion and located on a first direction side of the support portion, and a pair of locking plate portions extending from circumferential opposite ends of the bent plate portion,
wherein the holding portion is a cutout recess portion that includes a back wall surface configured to make contact with the base plate portion from a side opposite to the support portion in the second axial direction, a pair of side wall surfaces located at circumferential opposite sides of the back wall surface and configured to face each other in the circumferential direction, and a bottom wall surface extending in the second axial direction on a first direction side of the back wall surface and making contact with the thrust receiving member from a first direction side, the holding portion being opened toward a second direction and one side of the second axial direction, and
wherein the side wall surfaces each include locked surface parts formed at positions spaced apart from the bottom wall surface toward the second direction and extending in the circumferential direction to face the locking plate portions from the second direction side respectively.

9. The optical unit of claim 8, wherein the locking plate portions are inclined from the bent plate portion toward the second direction and have tip parts facing the locked surface parts.

10. The optical unit of claim 9, wherein each of the side wall surfaces includes opening side surface parts extending toward the second direction from ends of the locked surface parts on a side of the base plate portion and facing each other in the circumferential direction, and bottom wall surface side surface parts extending toward the first direction from ends of the locked surface parts opposite to the base plate portion and facing each other in the circumferential direction, and
wherein the locking plate portions have tip parts facing the bottom wall surface side surface parts.

11. The optical unit of claim 10, wherein an inclination angle at which each of the locking plate portions is inclined toward the second direction from a virtual vertical plane perpendicular to the optical axis is larger than 45 degrees.

12. The optical unit of claim 10, wherein the thrust receiving member includes a pair of protrusion portions protruding from circumferential opposite ends of the base plate portion on a second direction side of the sphere fixing portion toward a side where the support portion is located in the second axial direction, and facing each other in the circumferential direction,
- wherein the gimbal frame includes a gimbal frame extension portion extending in the optical axis direction via region between the protrusion portions,
- wherein the gimbal frame extension portion includes the support portion at a first direction side tip, and further includes a passage portion located between the protrusion portions on a second direction side of the support portion,
- wherein a width dimension of the support portion in the circumferential direction is larger than a width dimension of the passage portion in the circumferential direction and larger than a gap between the protrusion portions, and
- wherein the holding portion overlaps with the protrusion portions when viewed from the optical axis direction.

13. The optical unit of claim 12, wherein the protrusion portions each include protrusion plate parts bending in the second axial direction from the circumferential opposite ends of the base plate portion, and extension plate parts bending from ends of the protrusion plate parts opposite to the base plate portion toward sides opposite to the base plate portion in the circumferential direction, and
- wherein the extension plate parts have circumferential ends facing the opening side surface parts of the side wall surfaces respectively.

14. The optical unit of claim 8, wherein each of the locking plate portions has the same thickness dimension as the bent plate portion and extends from the bent plate portion without being bent, and
- wherein each of the locked surface parts and the bottom wall surface are parallel to each other and are spaced apart by the thickness dimension of the bent plate portion in the optical axis direction.

* * * * *